United States Patent
Kurashima et al.

(10) Patent No.: US 6,997,703 B2
(45) Date of Patent: Feb. 14, 2006

(54) FIRING FURNACE AND FIRING METHOD

(75) Inventors: Yoshihiko Kurashima, Nagoya (JP);
Shigeru Hanzawa, Nagoya (JP);
Michitaka Hidaka, Nagoya (JP);
Toshihiko Honda, Nagoya (JP)

(73) Assignee: NGK Insulators, Ltd. (JP)

( * ) Notice: Subject to any disclaimer, the term of this patent is extended or adjusted under 35 U.S.C. 154(b) by 201 days.

(21) Appl. No.: 10/826,696

(22) Filed: Apr. 19, 2004

(65) Prior Publication Data

US 2005/0014104 A1 Jan. 20, 2005

(30) Foreign Application Priority Data

| Jul. 15, 2003 | (JP) | 2003-197289 |
| Sep. 18, 2003 | (JP) | 2003-325402 |
| Sep. 30, 2003 | (JP) | 2003-339999 |
| Jan. 28, 2004 | (JP) | 2004-020397 |

(51) Int. Cl.
*H01M 8/04* (2006.01)

(52) U.S. Cl. .......... 432/13; 429/20
(58) Field of Classification Search ........ 432/13, 432/72; 429/17, 19, 20, 12, 13; 110/203
See application file for complete search history.

(56) References Cited

U.S. PATENT DOCUMENTS

| 4,047,894 A | 9/1977 | Kuhl | 23/284 |
| 4,659,634 A * | 4/1987 | Struthers | 429/19 |
| 6,010,614 A * | 1/2000 | Keskar et al. | 205/765 |
| 6,071,116 A * | 6/2000 | Philippe et al. | 432/29 |
| 6,686,078 B1 * | 2/2004 | Jones | 429/17 |
| 6,783,877 B1 * | 8/2004 | Shimazu et al. | 429/17 |

FOREIGN PATENT DOCUMENTS

| JP | 50-10261 | 2/1975 |
| JP | 8-247409 | 9/1996 |
| JP | 2002-50371 | 2/2002 |
| JP | 2002-340482 | 11/2002 |
| JP | 2003-88210 | 3/2003 |
| JP | 2003-097306 | 4/2003 |

\* cited by examiner

*Primary Examiner*—Gregory Wilson
(74) *Attorney, Agent, or Firm*—Parkhurst & Wendel, L.L.P.

(57) ABSTRACT

The present invention provides a firing furnace (100) comprising a combusting means (2) for combusting a fuel (11), a firing furnace main body (1) for firing a member to be fired and exhausting a combustion gas, and a methane reforming device (3) for reacting a reforming material (23) composed of a methane sub fuel for reformation (21) and steam (22) with a methane reforming catalyst (6) filled therein while heating the same by the combustion gas for producing a reformed gas (24) containing hydrogen and carbon dioxide, capable of cutting back the fuel cost.

42 Claims, 6 Drawing Sheets

FIRING FURNACE AND FIRING METHOD

TECHNICAL FIELD

The present invention relates to a firing furnace and a firing method. More specifically, it relates to a firing furnace and a firing method, capable of dramatically cutting back the carbon dioxide amount contained in the combustion exhaust gas at the time of exhausting the combustion gas containing carbon dioxide obtained by combusting a fuel containing methane as the combustion exhaust gas, effectively utilizing and collecting the heat of the combustion gas, and furthermore, capable of cutting back the fuel cost.

BACKGROUND ART

Conventionally, as a device for heating a member to be heated in various industrial fields, the industrial furnaces have been used. Among the industrial furnaces, those heating the member to be heated by combusting a fuel containing a carbon generate a high temperature combustion gas containing carbon dioxide simultaneously with the heat generation by the combustion of the fuel. Then, the generated combustion gas was exhausted to the outside (hereinafter, the combustion gas exhausted to the outside may be referred to as the "combustion exhaust gas" or simply "exhaust gas".). Recently, the adverse effect on the environment by the discharge of the high temperature exhaust gas, or the like has been problematic. Moreover, the effective collection and recycling of the heat of the combustion exhaust gas have conventionally been the tasks. Moreover, especially the problem of the generation of the exhaust gas containing carbon dioxide attracts the attention particularly recently for the global warming issue, or the like so that cutback of the carbon dioxide amount contained in the exhaust gas from the industrial furnace has strongly been demanded.

On the other hand, as to the firing furnace for firing a ceramic, or the like as an industrial furnace of a relatively small size, the measure for collecting the heat of the combustion exhaust gas or the measure for cutting back the carbon dioxide exhaustion amount have hardly been adopted so that the combustion gas containing carbon dioxide used for heating the member to be heated (member to be fired) has been discharged as it is to the atmosphere as the exhaust gas. In contrast, a method for collecting the heat energy of the exhaust gas by for example returning the exhaust gas emitted from the firing furnace main body again to the firing furnace main body has been proposed (for example, see the official gazette of the Japanese Patent Application Laid Open (JP-A) No. 2002-340482). According to the method, since a part of the heat energy of the exhaust gas is collected, the total amount of the used fuel can be cut back, however, the energy collection amount and the fuel cutback amount were not so large. Moreover, although the carbon dioxide amount generated thereby can be cut back, the cutback amount was not so large as well.

DISCLOSURE OF THE INVENTION

The firing furnace and the firing method capable of solving the above-mentioned problems are as follows.

[1] A firing furnace comprising a combusting means for combusting a fuel containing methane flown therein for generating a combustion gas, and a firing furnace main body for heating and firing a member to be fired, that has been conveyed into its inside, by the combustion gas and exhausting the combustion gas after firing the member to the outside, wherein a methane reforming device filled with a methane reforming catalyst in the inside, for producing a reformed gas containing hydrogen and carbon dioxide by contacting a reforming material comprising a methane sub fuel for reformation having methane flown therein as a major component and steam with the methane reforming catalyst while heating the material by the combustion gas so as to react methane in the reforming material with steam, is further provided.

[2] The firing furnace according to the item [1], wherein the methane reforming device is provided in the firing furnace main body for contacting the reforming material with the methane reforming catalyst while heating the material by the combustion gas so as to produce a reformed gas.

[3] The firing furnace according to the item [1], wherein the methane reforming device is provided outside the firing furnace main body for contacting the reforming material with the methane reforming catalyst while heating the material by the combustion gas exhausted to the outside of the firing furnace main body, so as to produce a reformed gas.

[4] The firing furnace according to the item [1], further comprising a fuel cell for generating electricity by the reaction of hydrogen and oxygen or air, wherein a part or the entirety of hydrogen contained in a reformed gas is used for reaction with oxygen or air in the fuel cell as hydrogen for the fuel cell.

[5] The firing furnace according to the item [1], further comprising a hydrogen separating device for separating a reformed gas produced in the methane reforming device by flowing the reformed gas into the inside for selectively separating hydrogen in the reformed gas into a hydrogen fuel containing hydrogen as a major component and a residual gas containing carbon dioxide.

[6] The firing furnace according to the item [5], wherein a part or the entirety of hydrogen fuel is used for reaction with oxygen or air in the fuel cell as hydrogen for the fuel cell.

[7] The firing furnace according to the item [5], wherein a part or the entirety of hydrogen fuel is mixed with a methane main fuel for mixture containing methane as a major component so as to provide a fuel mixture, and combusting the fuel mixture in the combusting means.

[8] The firing furnace according to the item [5], wherein a part of hydrogen fuel is used for reaction with oxygen or air in the fuel cell as hydrogen for the fuel cell, remainder part is mixed with a methane main fuel for mixture containing methane as a major component so as to provide a fuel mixture, and combusting the fuel mixture in the combusting means.

[9] The firing furnace according to the item [7], wherein the volume ratio of the methane sub fuel for reformation and the methane main fuel for mixture (methane sub fuel for reformation:methane main fuel for mixture) is 5:95 to 100:0.

[10] The firing furnace according to the item [8], wherein volume ratio of the methane sub fuel for reformation and the methane main fuel for mixture (methane sub fuel for reformation:methane main fuel for mixture) is 5:95 to 100:0.

[11] The firing furnace according to the item [5], wherein a residual gas exhausted from the hydrogen separating device is combusted by the firing means.

[12] The firing furnace according to the item [5], further comprising a carbon dioxide fixing device for fixing carbon dioxide in the residual gas separated by the hydrogen separating device not so as to discharge it in a gas state to the outside thereof.

[13] The firing furnace according to the item [12], wherein the carbon dioxide fixing device contains sodium hydroxide as a fixing agent for fixing carbon dioxide so as to produce sodium carbonate by making sodium hydroxide react with carbon dioxide.

[14] The firing furnace according to the item [1], wherein the firing furnace main body is a firing furnace main body of continuous type for conveying a member to be fired continuously into its inside and conveying the member continuously to the outside after heating the member to be fired in the inside.

[15] The firing furnace according to the item [1], wherein at least one of the methane sub fuel for reformation and the methane main fuel for mixture is a liquefied natural gas (LNG).

[16] The firing furnace according to the item [1], wherein the material of the member to be fired is a ceramic.

[17] The firing furnace according to the item [1], wherein the member to be fired has a honeycomb structure.

[18] A firing method comprising the steps of generating a combustion gas by flowing a fuel containing methane into a combusting means and combusting, introducing a combustion gas generated in combusting means into the inside of a firing furnace main body, heating and firing a member to be fired that have been conveyed into its inside by the combustion gas, and exhausting the combustion gas after firing the member to the outside of the firing furnace main body, wherein a reforming material composed of a methane sub fuel for reformation having methane flown therein as a major component and steam is flown into a methane reforming device filled with a methane reforming catalyst in the inside, and contacting the reforming material with the methane reforming catalyst while heating by the combustion gas so as to make methane in the reforming material react with steam for producing a reformed gas containing hydrogen and carbon dioxide.

[19] The firing method according to the item [18], wherein the methane reforming device is provided inside the firing furnace main body for contacting the reforming material with the methane reforming catalyst while heating the material by the combustion gas so as to produce the reformed gas.

[20] The firing method according to the item [18], wherein the methane reforming device is provided outside the firing furnace main body for contacting the reforming material with the methane reforming catalyst while heating the material by the combustion gas exhausted to the outside of the firing furnace main body so as to produce the reformed gas.

[21] The firing method according to the item [19], wherein the methane reforming device is provided outside the firing furnace main body for contacting the reforming material with the methane reforming catalyst while heating the material by the combustion gas exhausted to the outside of the firing furnace main body so as to produce the reformed gas.

[22] The firing method according to the item [18], wherein a part or the entirety of hydrogen contained in the reformed gas reacts with oxygen or air in the fuel cell as hydrogen for the fuel cell for the power generation.

[23] The firing method according to the item [18], wherein the reformed gas produced in the methane reforming device is flown into the inside of a hydrogen separating device for selectively separating hydrogen in the reformed gas into a hydrogen fuel containing hydrogen as a major component and a residual gas containing carbon dioxide.

[24] The firing method according to the item [23], wherein a part or the entirety of hydrogen fuel is used for the reaction with oxygen or air in the fuel cell as hydrogen for the fuel cell.

[25] The firing method according to the item [23], wherein a part or the entirety of hydrogen fuel is mixed with a methane main fuel for mixture containing methane as a major component so as to provide a fuel mixture, and combusting the fuel mixture in the combusting means.

[26] The firing method according to the item [23], wherein a part of hydrogen fuel is used for the reaction with oxygen or air in the fuel cell, the remainder part is mixed with a methane main fuel for mixture containing methane as a major component so as to provide a fuel mixture, and combusting the fuel mixture in the combusting means.

[27] The firing method according to the item [25], wherein the methane sub fuel for reformation and the methane main fuel for mixture are used with the volume ratio (methane sub fuel for reformation:methane main fuel for mixture) of 5:95 to 100:0.

[28] The firing method according to the item [26], wherein the methane sub fuel for reformation and the methane main fuel for mixture are used with the volume ratio (methane sub fuel for reformation:methane main fuel for mixture) of 5:95 to 100:0.

[29] The firing method according to the item [23], wherein the residual gas exhausted from the hydrogen separating device is combusted in the firing means.

[30] The firing method according to the item [23], wherein the residual gas separated in the hydrogen separating device is flown into a carbon dioxide fixing device, and carbon dioxide in the residual gas is fixed therein not so as to discharge it in a gas state to the outside thereof.

[31] The firing method according to the item [30], wherein the carbon dioxide fixing device contains sodium hydroxide as a fixing agent for fixing carbon dioxide and is capable of producing sodium carbonate by reacting sodium hydroxide with carbon dioxide.

[32] The firing method according to the item [18], wherein the firing furnace main body used therein is a continuous type of firing furnace main body that is capable of conveying the member to be fired continuously into the inside thereof, and conveying the fired member continuously to the outside after heating the member to be fired in the inside.

[33] The firing method according to the item [18], wherein a liquefied natural gas (LNG) is used as at least either one of the methane sub fuel for reformation and the methane main fuel for mixture.

[34] The firing method according to the item [18], wherein a ceramic is used as the material of the member to be fired.

[35] The firing method according to the item [18], wherein a honeycomb structure is used as a member to be fired.

BEST MODE FOR CARRYING OUT THE INVENTION

Figure 1:
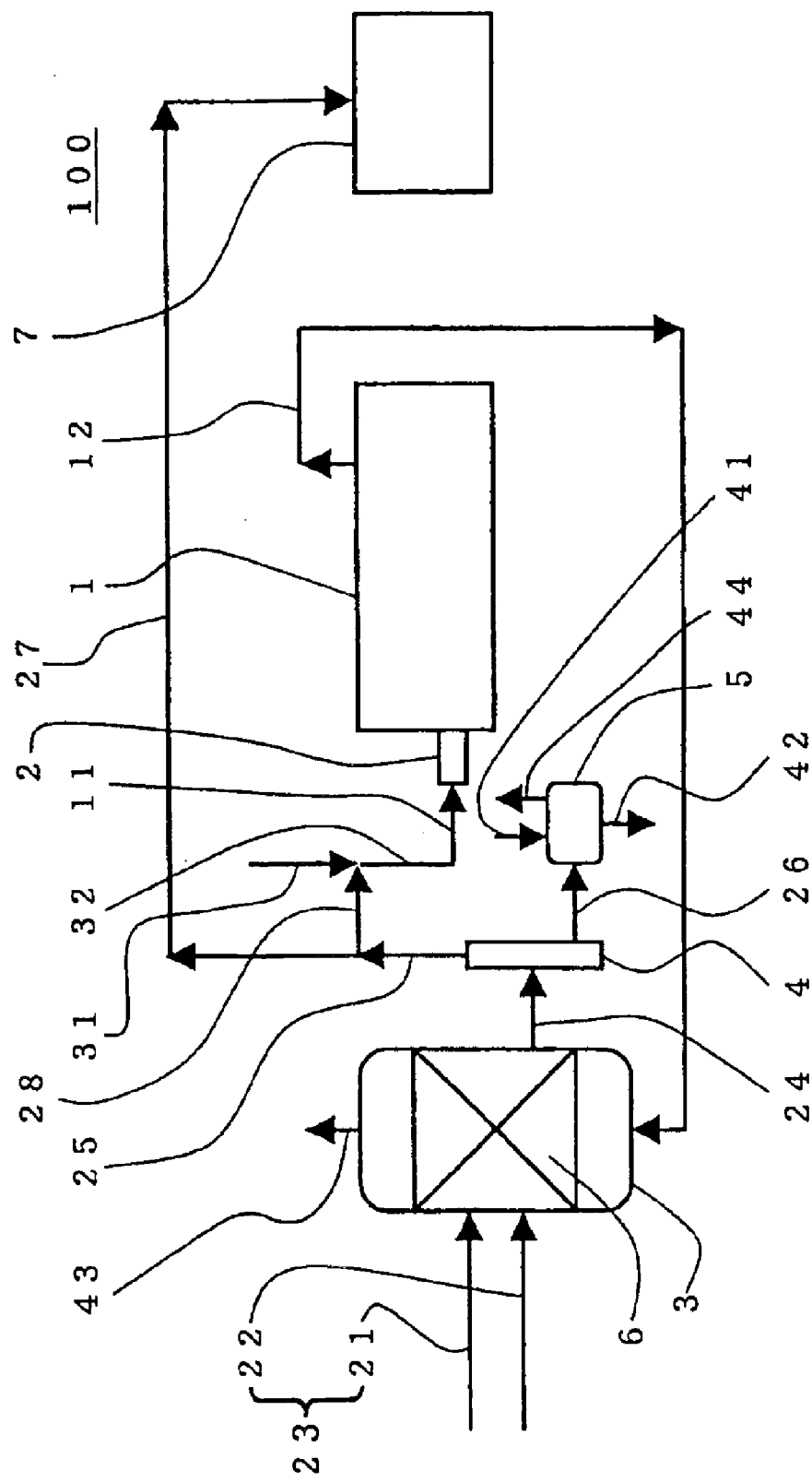
FIG. 1 is a block flow chart schematically showing an embodiment of a firing furnace of the present invention.

An object of the present invention is to provide a firing furnace and a firing method, capable of effectively collecting the heat of the combustion gas at the time of exhausting a combustion gas containing carbon dioxide obtained by combusting a fuel containing carbon, in particular a fuel containing methane to the outside, and cutting back the fuel cost. Moreover, according to an embodiment of fixing the amount of carbon dioxide contained in the combustion gas, the amount of carbon dioxide to be exhausted to the outside can dramatically be cut back.

According to the firing furnace of the present invention, since the quantity of heat of the combustion gas is used as the quantity of heat necessary for the endothermic reaction at the time of reacting the reforming material with the methane reforming catalyst, a part of the heat of the combustion gas which has been exhausted to the outside can be collected effectively as the combustion heat so that the total use amount of the fuel can be cut back. Moreover, as a method for collecting the heat of the combustion gas, there are a method of collecting from the combustion gas (hereinafter, it may be referred to as the "combustion exhaust gas") exhausted to the outside of the firing furnace main body, and a method of using the heat of the combustion gas in the firing furnace main body, and they may be carried out at the same time. By using the heat of the combustion gas in the firing furnace main body, the discharge of heat at the time when the combustion exhaust gas moves, or the like can be eliminated so that the quantity of heat can be collected further efficiently.

According to a preferable embodiment of the firing furnace of the present invention, since a fuel mixture of a methane main fuel containing methane as a major component, and a hydrogen fuel obtained by reacting a reforming material comprising a methane sub fuel for reformation which contains methane as a major component and steam with a methane reforming catalyst is used as the fuel containing methane to be combusted by the combusting means, the content of carbon dioxide in the combustion exhaust gas can dramatically be cut back. Moreover, since carbon dioxide to be produced at the time of reacting the reforming material with the methane reforming catalyst is fixed by the carbon dioxide fixing device, the discharge of carbon dioxide produced from the reforming material to the outside in a gas state can be prevented. Carbon dioxide fixed here corresponds to carbon dioxide reduced in carbon dioxide in the above-mentioned combustion exhaust gas. Furthermore, since the quantity of heat of the combustion gas in the firing furnace or the quantity of heat of the combustion exhaust gas discharged from the firing furnace main body is used as the quantity of heat necessary for the endothermic reaction at the time of reacting the reforming material with the methane reforming catalyst, a part of the heat of the combustion gas (a part of the exhaust heat of the combustion exhaust gas) can be collected effectively as the combustion heat of the fuel so that the total use amount of the fuel can be cut back.

According to another preferable embodiment of the firing furnace of the present invention, since a mixture of hydrogen and carbon dioxide (reformed gas) is produced from methane and steam in the methane reforming device, using the quantity of heat of the combustion gas in the firing furnace main body or the heat of the combustion exhaust gas to be exhausted from the firing furnace main body, and hydrogen is separated from the reformed gas by a hydrogen separating device for taking out hydrogen fuel so that hydrogen fuel is used as hydrogen for the fuel cell in the fuel cell for the power generation, the heat of the combustion gas (combustion exhaust gas) can be collected effectively so as to be utilized for the power generation by the fuel cell. Hydrogen fuel may be used partially for the fuel mixture and the residual part thereof may be used as hydrogen for the fuel cell. Furthermore, the entirety of hydrogen fuel may be used as the fuel mixture.

Moreover, according to the firing method of the present invention, as in the case of firing with the above-mentioned firing furnace of the present invention, since the quantity of heat of the combustion gas in the firing furnace main body or the quantity of heat of the combustion exhaust gas to be exhausted from the firing furnace main body is used as the quantity of heat necessary for the endothermic reaction at the time of reacting the reforming material with the methane reforming catalyst, a part of the heat of the combustion gas (combustion exhaust gas) can be collected as the combustion heat so that the total use amount of the fuel can be cut back. Moreover, by using the heat of the combustion gas instead of using the heat of the combustion exhaust gas, the discharge of heat at the time when the combustion exhaust gas moves, or the like can be eliminated so that the quantity of heat can be collected further efficiently.

According to a preferable embodiment of the firing method of the present invention, since a mixture of hydrogen and carbon dioxide (reformed gas) is produced from methane and steam in the methane reforming device, using the heat of the combustion exhaust gas to be exhausted from the firing furnace main body, and hydrogen is separated from the reformed gas from the hydrogen separating device for taking out a hydrogen fuel so that hydrogen fuel is used as hydrogen for the fuel cell in the fuel cell for the power generation, the heat of the combustion exhaust gas can be collected effectively so as to be utilized for the power generation by the fuel cell.

According to another preferable embodiment of the firing method of the present invention, since a fuel mixture of a methane main fuel containing methane as a major component, and hydrogen obtained by reacting a reforming material composed of a methane sub fuel for reformation containing methane as a major component and steam with a methane reforming catalyst is used as the fuel containing methane to be combusted by the combusting means, the content of carbon dioxide in the combustion exhaust gas can dramatically be cut back. Moreover, it is preferable when carbon dioxide to be produced at the time of reacting the reforming material with the methane reforming catalyst is fixed by the carbon dioxide fixing device. This is because the discharge of carbon dioxide produced from the reforming material to the outside in a gas state can be prevented. The amount of carbon dioxide fixed here corresponds to the one of carbon dioxide reduced in carbon dioxide in the above-mentioned combustion exhaust gas.

Next, with reference to the drawings, embodiments of the present invention will be explained in detail, however, the present invention is not limited to the below-mentioned embodiments, and it should be understood that alteration, improvement of the design, or the like can be applied optionally based on the ordinary knowledge of those skilled in the art without departing from the scope of the gist of the present invention.

FIG. 1 is a block flow chart schematically showing an embodiment of the firing furnace of the present invention. In FIG. 1, the arrows show the moving state of the fuels, the combustion exhaust gas, steam, the other substances, or the like.

As shown in FIG. 1, the firing furnace 100 of this embodiment comprises a combusting means 2 for combusting a fuel 11 containing methane flown therein for generating a combustion gas, and a firing furnace main body 1 for heating and firing the member to be fired conveyed to its inside by the combustion gas and exhausting the combustion gas after firing to the outside. It further comprises a methane reforming device 3 filled with a methane reforming catalyst 6 in the inside for producing a reformed gas 24 (for executing the methane reforming reaction) containing hydrogen and carbon dioxide by reacting methane in the reforming material 23 and steam 22 by contacting a reforming material 23 composed of a methane sub fuel for reformation 21 containing methane flown therein as a major component and steam 22 with the methane reforming catalyst 6 while heating the reforming material by the combustion gas (combustion exhaust gas 12) exhausted from the firing furnace main body 1 to the outside.

According to the firing furnace 100 of this embodiment, since the methane reforming reaction by the methane reforming device 3 is carried out while utilizing the heat of the combustion exhaust gas 12, the heat of the combustion exhaust gas 12 can be reused effectively.

Furthermore, as shown in FIG. 1, the firing furnace 100 of this embodiment further comprises a hydrogen separating device 4 for allowing inflow of the reformed gas 24 produced by the methane reforming device 3 to its inside for selectively separating hydrogen in the reformed gas 24 into a hydrogen fuel 25 containing hydrogen as a major component and a residual gas 26 containing carbon dioxide, and a carbon dioxide fixing device 5 for fixing carbon dioxide in the residual gas 26 separated by the hydrogen separating device 4 so as not to discharge carbon dioxide to the outside in a gas state.

Thus, according to the firing furnace 100 of this embodiment, the reduction of the content amount of carbon dioxide in combustion exhaust gas 12 is attained by generating a combustion gas with combusting the fuel mixture 32 between the methane main fuel for mixing 31 which contains methane flown therein as a major component and hydrogen fuel 25 separated by the hydrogen separating device 4 (hydrogen fuel for mixing 28); that is, by using the fuel mixture 32 as the fuel 11 containing methane. Thereby, the exhaust amount of carbon dioxide to the outside at the time of exhausting the combustion exhaust gas 12 as the reforming device exhaust gas 43 after having been used by the methane reforming device 3 can be reduced. Then, since the methane reforming reaction by the methane reforming device 3 is executed while using the heat of the combustion exhaust gas, the heat of the combustion exhaust gas can be reused effectively. Moreover, the carbon dioxide fixing device 5 is so constructed that the inflow of sodium hydroxide as a fixing agent 41 into the fixing device becomes possible so as to make the fixing agent 41 contact with the residual gas 26 in the inside thereof, and make carbon dioxide contained in the residual gas 26 absorbed by the fixing agent 41 so as to produce sodium carbonate, and the waste liquid 42 containing sodium carbonate is discharged to the outside thereof. Here, in the methane main fuel for mixture 31 containing methane as a major component, "containing methane as a major component" denotes that the content ratio of methane is 80 (% by volume) or more.

Moreover, the fixing agent 41 is not particularly limited as long as it can react with carbon dioxide or absorb carbon dioxide, and a NaOH, an $Mg(OH)_2$, or the like can be presented. Moreover, the devices are connected with a predetermined piping such that the fuels, steam, or the like flow and move in the piping.

According to the firing furnace 100 of this embodiment, since the fuel mixture 32 of the methane main fuel for mixture 31 and hydrogen fuel 25 (hydrogen fuel for mixture 28) is used as the fuel 11 containing methane to be combusted by the combusting means 2, the generation of carbon dioxide can be reduced for the content of hydrogen (hydrogen fuel 25) not to generate carbon dioxide by the combustion in the fuel mixture 32 (fuel 11). At the time, the content ratio of hydrogen contained in the fuel mixture 32 (hydrogen/fuel mixture) is preferably 5 to 95 (% by volume), and it is further preferably 25 to 75 (% by volume). In the case it is less than 5 (% by volume), the carbon dioxide reducing effect may not be sufficient. In the case it is more than 95 (% by volume), at the time of executing the methane reforming reaction, not only the combustion exhaust gas, but also another heat source may be needed. Moreover, since carbon dioxide to be produced at the time of reacting the reforming material 23 with the methane reforming catalyst 6 is fixed by the carbon dioxide fixing device 5, the discharge to the outside in a gas state of carbon dioxide produced from the reforming material 23 can be prevented. Furthermore, since the quantity of heat of the combustion exhaust gas 12 exhausted from the firing furnace main body 1 is used as the quantity of heat needed for the endothermic reaction at the time of reacting the reforming material 23 with the methane reforming catalyst 6, a part of the exhaust heat of the combustion exhaust gas 12 can be collected effectively as the combustion heat of the fuel, and thereby the total use amount of the fuel can be cut back. Here, as the heat source for the methane reforming reaction, in addition to the combustion exhaust gas, the heat discharged from the furnace wall or the heat wasted at the time of cooling down the furnace tools used at the time of firing the ceramics can be used as well.

As shown in FIG. 1, the firing furnace 100 of this embodiment further comprises a fuel cell 7. The fuel cell 7 is for the power generation by reacting hydrogen (hydrogen for the fuel cell) and oxygen or air. As shown in FIG. 1, it is preferable that hydrogen fuel 25 obtained by the separation by the hydrogen separating device 4 is divided into a part as hydrogen for the fuel cell 28 so as to be used in the fuel cell 7 for the power generation, however, the reformed gas 24 exhausted from the reforming device 3 may be used directly by the fuel cell 7 without passing through the hydrogen separating device 4. Since hydrogen fuel 25 obtained by the separation by the hydrogen separating device 4 has a high hydrogen purity, the power generation can be executed efficiently by the fuel cell 7. For example, in the case of the power generation by the fuel cell using an ordinary hydrogen, the electric power efficiency is about 40%, however, according to the fuel cell 7 used in this embodiment, the electric power efficiency can be dramatically as high as 60 to 70%. Moreover, by combusting a part of hydrogen fuel 25 separated and obtained by the hydrogen separating device 4 finally by the combusting means 2 as hydrogen fuel for mixture 28 and utilizing the remainder thereof as hydrogen for the fuel cell 27 for the power generation by the fuel cell 7, the amount of carbon dioxide contained in the combustion exhaust gas 12 can be reduced, and at the same time, the heat of the combustion exhaust gas 12 can be collected effectively so as to be utilized for the power generation.

Moreover, in the case the reformed gas 24 exhausted from the reforming device 3 is used directly by the fuel cell 7 without passing through the hydrogen separating device 4, hydrogen in the reformed gas 24 is utilized for the power generation, however, the residual gas is exhausted from the fuel cell 7. It is preferable that the residual gas is mixed with the fuel so as to be combusted by the combusting means. Moreover, also in the case a part or the entirety of hydrogen fuel 25 obtained by the separation by the hydrogen separating device 4 is used in the fuel cell 7, since the residual gas is exhausted from the fuel cell 7, it is also preferable to mix the residual gas with the fuel so as to be combusted by the combusting means.

In the case the residual gas discharged from the fuel cell contains carbon dioxide and the carbon dioxide fixing device is used, it is preferable that the residual gas discharged from the fuel cell is passed through the carbon dioxide fixing device in order to remove carbon dioxide and then the remainder is combusted after being mixed with the fuel.

The hydrogen fuel 25 may be used as hydrogen fuel for mixture 28 for the entirety, or it may be used as hydrogen fuel for mixture 28 and hydrogen for the fuel cell 27 separately. The ratio of separating the same into hydrogen fuel for mixture 28 and hydrogen for the fuel cell 27 is not particularly limited, and it may be separated so as to balance the exhaust amount of carbon dioxide and the power generation amount optionally to the optimum values.

According to the firing furnace 100 of this embodiment shown in FIG. 1, the firing furnace main body 1 is not particularly limited, and those used ordinarily in conveying into its inside a ceramic, or the like as the member to be fired, and firing the member to be fired such as a ceramic by the combustion gas generated by combusting the fuel 11 containing methane by the combusting means 2 can be used. As the member to be fired, a ceramic honeycomb structure can be fired preferably. Here, the ceramic honeycomb structure refers to a ceramic honeycomb structure having a plurality of cells to be the channel of a fluid, sectioned by partition walls. Moreover, the firing furnace main body 1 may be of the batch system of firing intermittently a predetermined amount of members to be fired as a one time firing unit each time, however, it is preferably a firing furnace main body 1 of continuous type for continuously conveying into its inside a member to be fired such as a ceramic honeycomb structure, and conveying the same continuously to the outside thereof after heating and firing the member to be fired in the inside. Since the combustion exhaust gas 12 can be exhausted constantly and stably from the firing furnace main body 1 by firing continuously, the methane reforming reaction can be carried out stably by the heat of the combustion exhaust gas 12 in the methane reforming device 3, and thereby hydrogen fuel 25 can be supplied stably, and thus the fuel mixture 32 obtained by mixing hydrogen fuel 25 and the methane main fuel for mixture 31 can be supplied stably to the combusting means 2.

According to the firing furnace 100 of this embodiment shown in FIG. 1, the combusting means 2 is not particularly limited as long as it can efficiently combust the fuel 11 containing methane and hydrogen. The combusting means 2 may be provided outside the firing furnace main body 1 such that the combusting gas flows into the firing furnace main body 1 by piping, or it may be provided inside the firing furnace main body 1. Moreover, in the case of combusting means 2, one or a plural number of combusting means may be provided within the firing furnace main body 1 depending on its ability, the size of the firing furnace main body 1, or the like. The type of the combusting means 2 is not particularly limited as long as it is a burner having lines for introducing air, and the fuel gas. A regeneration type burner that preheats air for the combustion, or the like can be used preferably as well.

According to the firing furnace 100 of this embodiment shown in FIG. 1, the inside of the container which is made of a stainless steel, a ceramic, or the like of the methane reforming device 3 is filled with the methane reforming catalyst 6, and the reforming device produces a reformed gas 24 containing hydrogen and carbon dioxide by making a reforming material 23 react with steam 22 by contacting the reforming material 23 composed of a methane sub fuel for reformation 21 having methane flown therein as a major component and steam 22 with the methane reforming catalyst 6 (subjecting it to the methane reforming reaction) while heating the material with the combustion exhaust gas 12. Any type of devices may be used as a methane reforming device 3 for this embodiment as long as it may form hydrogen by reacting methane and furthermore fix carbon in methane not so as to finally discharge it to the outside of the system. The fixation of carbon in methane may be done in the step after the step wherein the methane reforming device 3 is under working. In this embodiment, the fixation step of carbon dioxide in the carbon dioxide fixing device 5 corresponds thereto. The reaction ratio of methane and water in the methane reforming device 3 (the ratio of the amount of hydrogen actually generated with respect to the theoretical value of the amount of hydrogen to be generated with respect to the inputted materials (methane and water)) is preferably 50 (% by mole) or more. In the case it is lower than 50 (% by mole), the amount of the fuel to be used may become large. Moreover, the higher reaction ratio between methane and water, the more preferable.

The content ratio of hydrogen in the reformed gas 24 to be produced by the methane reforming device 3 is preferably 10 to 80% by mole, and the content ratio of carbon dioxide is preferably 1 to 20% by mole.

The shape of the container to be filled with the methane reforming catalyst 6 is not particularly limited, and it may be any shape such as cylindrical, box like, or the like.

As the specific example of the methane reforming device 3, for example, one may preferably use one in which the method called "ICI method" for producing hydrogen (4 moles) and carbon dioxide (1 mole) by the endothermic reaction of methane (1 mole) and water (2 moles), under the conditions of a 700 to 950 (C) temperature, and a $1.01 \times 10^5$ to $40.52 \times 10^5$ (N/m$^2$) pressure in the presence of a catalyst containing a nickel is employed. As the catalyst containing a nickel, for example, the Synetix catalyst produced by Johnson Massay Corp., or the like can preferably be used. Furthermore, as an effective catalyst, an Ni based one, a Cu based one, a transitional metal based one, a platinum based one, or the like can be taken up.

In the methane reforming device 3, since the reaction for producing hydrogen from methane is the endothermic reaction, the reaction needs to be carried out while heating. According to this embodiment, the heating operation is executed by the combustion exhaust gas 12 to be exhausted from the firing furnace main body 1. Therefore, the heat of the combustion exhaust gas 12 can be collected effectively without additionally generating the heat. Thereby, the total use amount of the fuel can be cut back so that the energy resource can be utilized efficiently. Here, the temperature of the combustion exhaust gas 12 is preferably 200 to 950 (C). In the case it is lower than 200 (C), methane and steam may hardly react, and if it is higher than 950 (C), the endurance of the members comprising the reaction device can be deteriorated. Moreover, since the quantity of heat of the combustion exhaust gas 12 depends on the kind, the size of the firing furnace main body 1, or the like, it is not particularly limited.

In the firing furnace 100 of this embodiment shown in FIG. 1, the hydrogen separating device 4 is for separating the reformed gas 24 containing hydrogen and carbon dioxide produced in the methane reforming device 3 by flowing the resultant into the inside of the device for selectively separating hydrogen in the reformed gas 24 into a hydrogen fuel 25 containing hydrogen as a major component and the residual gas 26 containing carbon dioxide. The hydrogen separating device 4 is not particularly limited as long as it can selectively separate hydrogen from the gas mixture containing hydrogen. For example, one may preferably use a device constructed in such a manner that a cylindrical-shaped article is formed from a film like form made of palladium or an alloy containing palladium (hydrogen separation film); thus formed hydrogen separation film is installed in a cylindrical container made of a stainless steel, or the like in such a manner that an inner space and an outer space defined by the cylindrical of the hydrogen separation film is not connected; a gas mixture containing hydrogen can be flown into the cylindrical container and introduced into the inner side of the cylinder of the hydrogen separation film; only hydrogen is selectively penetrated from the inner side of the hydrogen separation film to the outer circumferential side thereof; and, hydrogen thus penetrated out to the outer circumferential side of the cylinder of the hydrogen separation film can, be passed to the outside of the cylindrical container as hydrogen fuel 25, and the remaining gas as a residual gas 26 is passed, as it is, through the inside of the cylinder of the hydrogen separation film toward the outside of the cylindrical container. The gas mixture containing hydrogen can be introduced to the outside of the cylinder of the hydrogen separation film for flowing hydrogen to the inner side of the cylinder of the hydrogen separation film. Here, the separated hydrogen is used as hydrogen fuel 25 containing hydrogen as a major component, and the other residual gas 26 containing carbon dioxide is sent to the carbon dioxide fixing device 5. The term "containing hydrogen as a major component" used in the above-mentioned hydrogen fuel 25 containing hydrogen as a major component means one having hydrogen content ratio of 50 (% by volume) or more. Moreover, the above-mentioned cylindrical container is not necessarily cylinder like, and as long as it has a shape having a space in the inside thereof, for example, it may be box like, or the like. The hydrogen separation film may be arranged on the surface or the inside of a porous member made of a ceramic, or the like, for improving the mechanical strength thereof. Moreover, the hydrogen separation film is not necessarily cylinder like, and it may have a flat shape or any other shapes.

One may use, as hydrogen fuel 25, hydrogen formed in a hydrogen separating device which has been integrally formed from a hydrogen separating device 4 and a methane reforming device 3, by selectively separating hydrogen which has been generated in the methane reforming device 3 by the hydrogen separating device 4 provided in the methane reforming device 3 and flowing out hydrogen from the methane reforming device 3. As a method for providing the hydrogen separating device 4 in the methane reforming device 3, for example, the hydrogen separation film formed cylindrically can be provided in the methane reforming device 3, and the methane reforming catalyst 6 can be provided inside thus formed cylindrical shape. In this case, the hydrogen separation film serves as a hydrogen separating device 4 so that it means that the hydrogen separating device 4 is provided in the methane reforming device 3. Thereby, the reforming material 23 is introduced to the inside of the cylindrical shape of the hydrogen separation film so that hydrogen is generated by the methane reforming catalyst 6 provided inside the cylindrical shape of the hydrogen separation film for flowing out hydrogen generated to the outer circumferential side of the cylinder of the hydrogen separation film. Then, hydrogen flown out is used as hydrogen fuel 25.

As to the hydrogen separation efficiency at the time of separating hydrogen from the reformed gas 24 by the hydrogen separating device 4, (the amount of hydrogen contained in the reformed gas 24: separated hydrogen amount) is preferably 50:50 to 1:99 (volume ratio). In the case it is lower than 50:50 (volume ratio), the fuel may not be used efficiently. A higher separation efficiency is preferable, however, 1:99 (volume ratio) is sufficient for the collection efficiency of hydrogen for combustion, and for the realization of the separation efficiency higher than that may lead to the cost rise.

According to the firing furnace 100 of this embodiment shown in FIG. 1, the carbon dioxide fixing device 5 is used to fix carbon dioxide in the residual gas 26 separated by the hydrogen separating device 4 not so as to discharge it in a gas state to the outside. The carbon dioxide fixing device 5 is not particularly limited as long as it can fix carbon dioxide contained in the residual gas 26 not so as to discharge it in a gas state to the outside. For example, a method of fixing carbon dioxide of placing an aqueous solution of sodium hydroxide as the fixing agent 41 for fixing carbon dioxide in a predetermined container, introducing the residual gas 26 thereto, and making carbon dioxide contained in the residual gas 26 react with sodium hydroxide for producing sodium carbonate while bubbling the aqueous solution of sodium hydroxide by the residual gas 26 can be used preferably. Here, the fixation of carbon dioxide denotes prevention of the discharge of carbon dioxide to the outside in a gas state by making carbon dioxide react with the other substance or absorbing carbon dioxide by the other substance.

As mentioned above, since sodium carbonate can be produced by the carbon dioxide fixing device 5 by using the sodium hydroxide containing substance (solution) such as the aqueous solution of sodium hydroxide as an fixing agent 41, the waste liquid 42 discharged from the carbon dioxide fixing device 5 can be provided as sodium carbonate containing solution, and the carbon dioxide fixing device 5 can be used as the sodium carbonate producing device. Hereinafter, the carbon dioxide fixing device 5 will be explained in further details with reference to an example of using the same as the sodium carbonate producing device.

The structure of the above-mentioned predetermined container comprising the carbon dioxide fixing device 5 is not particularly limited as long as it can place sodium hydroxide in the inside for producing sodium carbonate by the reaction with carbon dioxide. For example, a cylindrical container having at least one introducing pipe for introducing the residual gas and sodium hydroxide and a discharging part for discharging the waste liquid (hereinafter, it may be referred to as the "sodium carbonate containing solution") can be used. The shape of the container is not particularly limited, and it may be cylindrical, polygonal cylinder having the bottom surface shape of a quadrilateral, or the like (including box like), cylindrical having the bottom surface shape of an variable shape (including box like), or the like. Moreover, as needed, the carbon dioxide fixing device 5 may be provided with an agitating device, a jacket or a coil for heating or cooling down. Furthermore, the carbon dioxide fixing device 5 may be of the batch system of providing the above-mentioned container, stopping the inflow of the residual gas at the time all sodium hydroxide has reacted substantially, and resuming the inflow of the residual gas again by placing sodium hydroxide in the container after discharging the sodium carbonate containing solution, however, it may be of a semi batch system of providing two or more of the above-mentioned container, switching the inflow of the residual gas from one container to another container at the time all sodium hydroxide reacts substantially in the one container, starting the production of sodium carbonate in the other container, and discharging the sodium carbonate containing solution from the container with substantially all sodium hydroxide has reacted during that time.

Moreover, as a method for producing sodium carbonate by fixing carbon dioxide, sodium hydroxide and carbon dioxide may react by using a sodium hydroxide aqueous solution as a fixing agent 41, circulating the sodium hydroxide aqueous solution, and flowing and mixing the residual gas 26 into the circulating sodium hydroxide aqueous solution. As the method for circulating the sodium hydroxide aqueous solution (sodium carbonate is also contained therein after the formation of sodium carbonate), for example, the sodium hydroxide aqueous solution can be placed in the container and the sodium hydroxide aqueous solution discharged via the piping from the container can be returned again to the container by a pump. At the time, to the circulating system for the aqueous solution containing sodium hydroxide and sodium carbonate produced by the reaction, and sodium hydroxide may be sent out continuously and furthermore the aqueous solution containing sodium carbonate circulating continuously may be taken out from the circulating system as the sodium carbonate containing solution (waste liquid) 42 for continuously operating the carbon dioxide fixing device 5.

In the case the carbon dioxide fixing device 5 is used as the sodium carbonate producing device, the content ratio of carbon dioxide in the residual gas 26 after separating hydrogen from the reformed gas 24 by the hydrogen separating device 4 is preferably 15 to 99.9% by mass, and it is further preferably 60% by mass or more. In the case it is lower than 15% by mass, since the impurities in the residual gas 26 are too many, the purity of sodium carbonate taken out from the sodium carbonate containing solution 42 discharged from the carbon dioxide fixing device 5 for purification can hardly be made higher. Moreover, in the case the content of carbon dioxide in the residual gas 26 is low or in the case the content of carbon dioxide in the residual gas 26 is to be made higher, a transformer (carbon monoxide transformer) may be provided. In this case, the residual gas 26 discharged from the hydrogen separating device 4 is flown into the transformer and the residual gas 26 transformed so as to have a higher carbon dioxide content ratio is flown into the carbon dioxide fixing device 5.

Moreover, in the case carbon monoxide produced as the byproduct by the methane reforming device 3 is contained in a large amount in the residual gas 26, a carbon monoxide transformer may be provided for in order to flow such a residual gas 26 into the carbon monoxide transformer. As a carbon monoxide transformer, one may use preferably a device capable of transforming carbon monoxide by contacting the residual gas 26 adjusted to 350 C to 360 C with a Fe—Cr based catalyst provided therein. In this case, the carbon monoxide transformer generates carbon dioxide and hydrogen using carbon monoxide and water as the materials.

Thereby, carbon monoxide contained in the residual gas 26 is transformed into carbon dioxide so that the content of carbon monoxide in the residual gas 26 can be lowered. Then, the residual gas 26 with the lowered content of carbon monoxide can be flown into the carbon dioxide fixing device 5. Since hydrogen is also generated in addition to carbon dioxide in the carbon monoxide transformer, hydrogen may be separated by passing the residual gas 26 flown out from the carbon monoxide transformer through the hydrogen separating device for mixing hydrogen with the fuel mixture 32 and using it. At the time, the hydrogen separating device may be provided additionally for flowing the total amount of the residual gas 26, or a part of the residual gas 26 may be circulated by taking out a part of the residual gas 26 so as to flow it into the hydrogen separating device 4 together with the reformed gas 24. The transformed residual gas 26 with a higher carbon dioxide content ratio (the residual gas 26 flown out from the hydrogen separating device at the time it passes through the hydrogen separating device after the transformation) is made to flow into the carbon dioxide fixing device 5.

Moreover, in the case carbon monoxide still remains in the residual gas 26 after transforming the residual gas 26 by the above-mentioned carbon monoxide transformer, or the residual gas 26 with carbon monoxide remaining is not transformed by the carbon monoxide transformer, carbon monoxide which has been contained in the residual gas 26 still remains in the exhaust gas 44 (carbon dioxide fixing device exhaust gas) of the residual gas 26 which was flown into the carbon dioxide fixing device 5, even after carbon dioxide has been reacted therein. As a method for treating carbon monoxide contained in the carbon dioxide fixing device exhaust gas 44, it is preferable to mix the carbon dioxide fixing device exhaust gas 44 with the fuel mixture 32 so as to combust the mixture by the combusting means 2. At the time, in the case hydrogen is contained in the carbon dioxide fixing device exhaust gas 44, hydrogen is combusted as the fuel by the combusting means 2, and thus it is preferable.

The firing furnace main body 1 may be corroded due to the unintentionally introduced sodium hydroxide therein since the exhaust gas 44 from the carbon dioxide fixing device may contain sodium hydroxide, in the case that the exhaust gas 44 from the carbon dioxide fixing device is mixed with the fuel mixture 32 and supplied to the firing furnace main body 1. This is because droplets of the solution containing sodium hydroxide may be scattered and resultantly contained in the exhaust gas 44 from the carbon dioxide fixing device. Therefore, at the time of mixing the carbon dioxide fixing device exhaust gas 44 with the fuel mixture 32 for the combustion, it is preferable to remove sodium hydroxide before the combustion. The elimination of sodium hydroxide may be done either before or after mixing the carbon dioxide fixing device exhaust gas 44 with the fuel mixture 32. For example, sodium hydroxide can be removed by passing the carbon dioxide fixing device exhaust gas 44 through the sodium hydroxide removing device (not shown) before being mixed with the fuel mixture 32. As the sodium hydroxide removing device, a trap filled with water, or the like can be used, and it is provided preferably in the midway of the piping.

In the case carbon dioxide in the residual gas 26 is not reacted completely in the carbon dioxide fixing device 5 so that the unreacted carbon dioxide remains in the carbon dioxide fixing device exhaust gas 44, it is preferable that a part of the carbon dioxide fixing device exhaust gas 44 is taken out so as to flow into the carbon dioxide fixing device 5 again. Thereby, the residual carbon dioxide can be reduced. Moreover, another carbon dioxide fixing device may be provided as a second one to make the carbon dioxide fixing device exhaust gas 44 flow into the second carbon dioxide fixing device to produce sodium carbonate. Thereby, the residual carbon dioxide can further be reduced.

As to the above-mentioned methods including the method for treating the residual gas 26 by the carbon monoxide transformer, the method of mixing the carbon dioxide fixing device exhaust gas 44 with the fuel mixture 32, and the method for flowing the carbon dioxide fixing device exhaust gas 44 into the carbon dioxide fixing device, one may use any one of the methods among them alone, or any combination of them so as to attain the optimum conditions, depending upon the carbon monoxide amount contained in the residual gas 26, the amounts of carbon monoxide and carbon dioxide contained in the carbon dioxide fixing device exhaust gas 44.

The produced sodium carbonate in the carbon dioxide fixing device 5 is preferably purified in the sodium carbonate purifying process (not shown) after being discharged from the carbon dioxide fixing device 5 as the sodium carbonate containing solution 42 so as to be taken out as sodium carbonate of high purity. Therefore, the content ratio of sodium carbonate contained in the sodium carbonate containing solution 42 produced in the carbon dioxide fixing device 5 with respect to the remaining substance obtained by subtracting the water from the sodium carbonate containing solution 42 is preferably 80 to 99.9% by mass, and it is further preferably 95% by mass or more. In the case it is lower than 80% by mass, the purity of sodium carbonate obtained by purifying it with the above-mentioned sodium carbonate purifying process (not shown) can hardly be higher.

In order to have sodium carbonate accordingly purified and obtained with a high purity, it is preferable to use sodium hydroxide having a high purity to be reacted with carbon dioxide in the carbon dioxide fixing device 5. That is, the content ratio of sodium hydroxide in the fixing agent 41 to be placed in the inside of the carbon dioxide fixing device 5 with respect to the remaining substance obtained by subtracting water from the fixing agent 41 (the entirety of the fixing agent 41 in the case the fixing agent 41 does not contain water) is preferably 80 to 99.9% by mass, and it is further preferably 95% by mass or more. In the case it is lower than 80% by mass, the purity of sodium carbonate obtained by purifying it can hardly be higher. As the fixing agent 41, as mentioned above, an aqueous solution of sodium hydroxide may be used, or melted sodium hydroxide may be used as well. Moreover, in the case a sodium hydroxide aqueous solution is used as a fixing agent 41, the content ratio of sodium hydroxide with respect to the entirety of the aqueous solution is preferably 30 to 95% by mass. In the case it is lower than 30% by mass, since the concentration of sodium hydroxide is low, it can hardly react with carbon dioxide efficiently so that the content of carbon dioxide remaining in the carbon dioxide fixing device exhaust gas 51 can be higher. Moreover, in the case it is higher than 95% by mass, the viscosity of an aqueous solution of sodium hydroxide is made higher so as to deteriorate the flowability, and thus it can hardly react with carbon dioxide efficiently.

The purity of sodium carbonate to be taken out by purifying the sodium carbonate containing solution 42 discharged from the carbon dioxide fixing device 5 in the purification process (not shown) is preferably 98 to 99.9% by mass, and it is further preferably 99.0% by mass or more.

By having sodium carbonate of a purity of 98% by mass or more, the obtained sodium carbonate of high purity can be used in the field such as the optical glass, the medical products, or the like, requiring sodium carbonate of a high purity as the material. The higher as the upper limit of the purity of sodium carbonate is, the more preferable. Moreover, the content ratio of sodium carbonate with respect to the entirety of the sodium carbonate containing solution 42 is preferably 60 to 95% by mass. In the case it is lower than 60% by mass, since the concentration of sodium carbonate is low, sodium carbonate crystals may hardly be produced efficiently. Moreover, in the case it is higher than 95% by mass, the flowability may be deteriorated due to the high slurry concentration by sodium carbonate crystals at the time of crystallizing sodium carbonate by a crystallizing device.

As a purification method for purifying the sodium carbonate containing solution 42 discharged from the carbon dioxide fixing device 5, a method of taking out sodium carbonate crystals from the sodium carbonate containing solution by precipitating sodium carbonate crystals from the sodium carbonate containing solution 42 and separating the precipitated sodium carbonate from the mother liquid is preferable. It is preferable that the purification method thereof is carried out in the purification process (not shown) wherein said process is being provided with a crystallizing device (not shown) for precipitating sodium carbonate crystals from the sodium carbonate containing solution 42, and a filtrating device (not shown) for separating the crystals of sodium carbonate precipitated by the crystallizing device from the mother liquid.

As the crystallizing device, a crystallizing device ordinarily used industrially can be used. For example, a cylindrical crystallizing device comprising an agitating device, a jacket, a coil, or the like, capable of precipitating the crystals by cooling down the solution can be used. In the case that temperature of the sodium carbonate containing solution 42 is so lowered that a part of the contained sodium carbonate has been already precipitated, it may be filtrated directly by the filtrating device without crystallization by the crystallizing device, or it may be filtrated by the filtrating device after passing through the crystallizing device in advance.

As the filtrating device, those used ordinarily industrially, such as a basket type centrifugal filtrating device, a gravity type filtrating device, a reduced pressure filtrating device, or the like can be used. Since sodium carbonate is still dissolved in the mother liquid discharged from the filtrating device, by further using another crystallizing device for lowering temperature of the mother liquid, sodium carbonate can be precipitated and the precipitated crystals of sodium carbonate can be filtrated by the filtrating device. Moreover, since the unreacted sodium hydroxide is contained in the mother liquid to be discharged from the filtrating device, for effectively utilizing sodium hydroxide, it may be returned to the carbon dioxide fixing device 5 after adjusting the sodium hydroxide concentration by further adding sodium hydroxide thereto.

In general, as a method for producing sodium carbonate, a production method by the ammonia soda process, a purification method using a naturally occurring material represented by the Torona ash produced from the Green river mineral deposit of the Wyoming state, or the like are known. However, according to these methods, it is difficult to purify sodium carbonate in a highly purified state, and a problem is involved in that the purification cost is made higher for purifying it in a highly purified state. For example, according to the ammonia soda process, since sodium chloride is used as a starting material, it is required to remove chorine after producing sodium carbonate. If the removal of chlorine is insufficient, the purity of sodium carbonate becomes lower. If one wishes to remove chlorine sufficiently to give sodium carbonate having a high purity, the cost for purification would become higher. Moreover, in the case the naturally occurring material is used, since the naturally occurring material itself includes a lot of impurities, the purification cost for removing the impurities becomes higher. On the other hand, one may obtain sodium carbonate of a high purity can be obtained with simplified purification process and reduced purification cost by producing sodium carbonate using the carbon dioxide fixing device comprising the firing furnace of this embodiment. This is because carbon dioxide obtained by the methane reformation and sodium hydroxide of a high purity are used as the materials.

According to the firing furnace 100 of this embodiment shown in FIG. 1, for the fuel cell 7, a commercially available system can be used. It may be any of the polymer type, the phosphate type, the molten carbonate type, the solid electrolyte type, or the like, however, since the exhausted heat is of high temperature, the phosphate type, or the molten carbonate type, or the solid electrolyte type are preferable. Moreover, the electric power capacity to be generated can be about 100 KW to 200 KW per one system based on the performance of the present commercially available system. By adopting a method of installing the systems in parallel, or the like, the electric power capacity can be designed freely. Then, a part of hydrogen fuel 25 is sent through the piping system as hydrogen for the fuel cell 27 so that hydrogen for the fuel cell 27 and air (oxygen in air) react in the fuel cell 7 for generating the electric power.

According to the firing furnace 100 of this embodiment shown in FIG. 1, as the fuel to be combusted in the combusting means 2, the fuel mixture 32 of the methane main fuel for mixture 31 containing methane as a major component and hydrogen fuel 25 separated by the hydrogen separating device 4 isused. Since the combustion exhaust gas 12 is not discharged constantly (the state with the combustion exhaust gas 12 not yet generated or the state of gradual increment of the gas) at the time of starting the operation of the firing furnace 100 and thus it is difficult to effectuate the reaction by the methane reforming device 3 while using the combustion exhaust gas 12, the fuel mixture 32 may be used after stabilizing the inside of the firing furnace main body 1 for constantly discharging the combustion exhaust gas 12 (in the case the methane reforming device to be described later is provided in the firing furnace main body, it may be used after stabilizing the temperature of the combustion gas). In this case, at the time of starting the operation of the firing furnace 100, the firing operation is executed only with the methane main fuel for mixture 31 containing methane as a major component. Moreover, in the case the inside of the firing furnace main body 1 is not stabilized as at the time of starting the operation so that the combustion exhaust gas 12 is not constantly discharged, another heating device by steam, the electricity, or the like (not shown) may be provided in the methane reforming device 3 for operating the methane reforming device 3 while using the heating device.

The firing furnace 100 according to this embodiment shown in FIG. 1 can be used preferably as a firing furnace for firing a ceramic requiring the quantity of heat of 1,000,000 to 100,000,000 (kJ/Hr) at the time of firing.

The volume ratio of the methane sub fuel for reformation 21 and the methane main fuel for mixture 31 (the methane sub fuel for reformation 21: the methane main fuel for mixture 31) is preferably 5:95 to 100:0 (volume ratio). In the case the ratio of the methane sub fuel for reformation 21 is less than 5 (volume ratio), carbon dioxide may not be cut back sufficiently. Moreover, at least one of the methane main fuel for mixture 31 and the methane sub fuel for reformation 21 can be a liquefied natural gas (LNG). By having the same as the LNG, the combusting operation can be executed efficiently owing to the good combustion property of the LNG. Moreover, since the LNG is a clean and inexpensive fuel, the hazardous substances such as the sulfur oxide and the dusts are not generated by the combustion, and thus it is preferable.

Next, the difference of the fuel use amounts and the generated quantity of heat, and the difference of the generated carbon dioxide at the time of using the fuel mixture 32 of the methane main fuel for mixture 31 and hydrogen fuel 25 and combusting the same in the combusting means 2 (this embodiment) and at the time of using only methane gas (a gas having 100 (%) methane content ratio) as the fuel and combusting the same in the combusting means 2 (comparative example) in the firing furnace 100 according to this embodiment shown in FIG. 1 will be explained.

For example, methane gas is used as the methane sub fuel for reformation 21 and the methane main fuel for mixture 31, the reaction ratio by the methane reforming device 3 is 100 (%) (4 moles of hydrogen are generated by introducing 1 mole of methane and 2 moles of water into the methane reforming device 3), the hydrogen separation efficiency in the hydrogen separating device 4 is 100 (%) (all hydrogen contained in the reformed gas 24 is separated by the hydrogen separating device 4 so as to be hydrogen fuel 25), and the total amount of hydrogen fuel 25 is mixed with the methane main fuel for mixture 31 as hydrogen fuel for mixture 28. In this case, in the case only methane gas is used by 1 ($Nm^3/Hr$) so as to be combusted by the combusting means 2, the quantity of heat of 39,800 (kJ/Hr) can be generated (comparative example). On the other hand, as an example of this embodiment, in the case 0.5 ($Nm^3/Hr$) of methane gas is used as the methane main fuel for mixture and the 0.4 ($Nm^3/Hr$) of methane gas is used as the methane sub fuel for reformation, 1.6 ($Nm^3/Hr$) of hydrogen is generated from the methane reforming device 3 so as to be separated by the hydrogen separating device 4, and the separated hydrogen is mixed as hydrogen fuel 25 with the above-mentioned methane sub fuel for reformation (methane gas) so as to provide the fuel mixture 32 (the gas mixture of 0.5 ($Nm^3/Hr$) of methane gas), and 1.6 ($Nm^3/Hr$) of hydrogen). In the case the fuel mixture 32 is combusted by the combusting means 2, the quantity of heat of 19,900 (kJ/Hr) is generated from 0.5 ($Nm^3/Hr$) of methane gas, and the quantity of heat of 20,480 (kJ/Hr) is generated from 1.6 ($Nm^3/Hr$) of hydrogen. Therefore, the quantity of heat obtained by combusting the fuel mixture 32 can be 40,380 (kJ/Hr).

As mentioned above, by combusting only methane gas, the quantity of heat of 39,800 (kJ/Hr) can be obtained with 1 ($Nm^3/Hr$) methane gas use amount. On the other hand, in the case of this embodiment, the quantity of heat of 40,380 (kJ/Hr) can be obtained with the 0.9 ($Nm^3/Hr$) total use amount of methane gas (the total of the methane main fuel for mixture 31 and the methane sub fuel for reformation 21). Moreover, since the carbon dioxide amount to be generated at the time of combusting 1 mole of methane gas is 1 mole (theoretical amount), in the case of the above-mentioned comparative example, the amount of carbon dioxide formed is 1 ($Nm^3/Hr$). On the other hand, in the case of the above-mentioned example of this embodiment, the amount of carbon dioxide formed is 0.5 (Nm³/H). Therefore, in the comparison of this embodiment and the case of the comparative example, the amount of methane gas used for having the quantity of heat to be generated by the combustion in the combusting means substantially equally (that of this embodiment is slightly larger) can be cut back by 10% in the case of this embodiment with respect to the case of the comparative example. Furthermore, the carbon dioxide amount to be generated can be cut back by 50% in the case of this embodiment with respect to the case of the comparative example.

Figure 2:
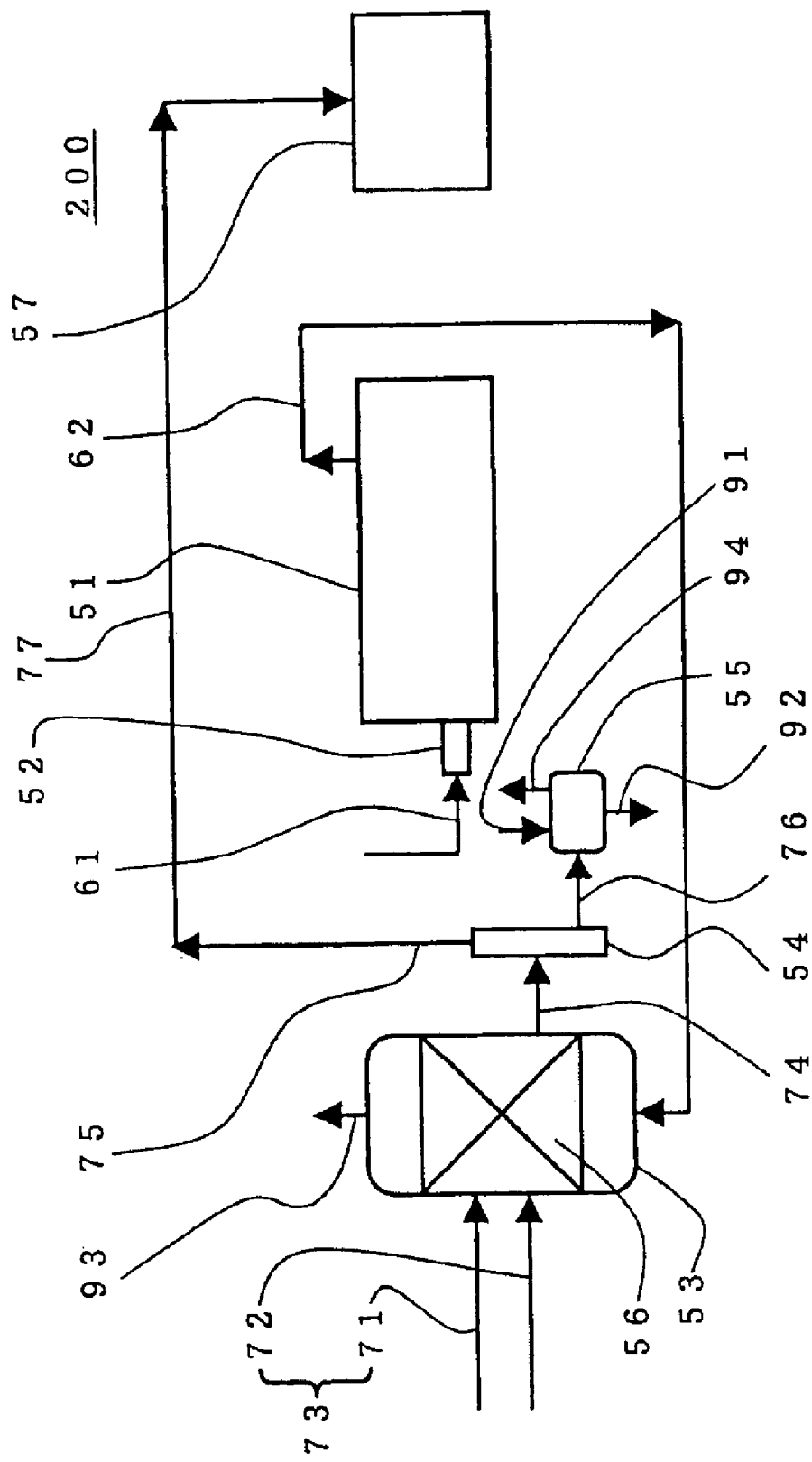
FIG. 2 is a block flow chart schematically showing another embodiment of a firing furnace of the present invention.

Next, another embodiment of the firing furnace of the present invention will be explained with reference to the drawings. FIG. 2 is a block flow chart schematically showing the firing furnace of this embodiment. Then, in FIG. 2, the arrows show the moving state of the fuels, the combustion exhaust gas, steam, the other substances, or the like.

As shown in FIG. 2, the firing furnace 200 of this embodiment comprises a combusting means 52 for combusting a fuel 61 containing methane flown therein and generating a combustion gas, and a firing furnace main body 51 for heating and firing the member to be fired conveyed to its inside by the combustion gas and exhausting the combustion gas after firing to the outside as the combustion exhaust gas 62 containing carbon dioxide (the combustion gas exhausted to the outside). It further comprises a methane reforming device 53 filled with a methane reforming catalyst 56 in the inside for producing a reformed gas 74 (for executing the methane reforming reaction) containing hydrogen and carbon dioxide by making methane in the reforming material 73 react with steam 72 by contacting a reforming material 73 composed of a methane sub fuel for reformation 71 containing methane flown therein as a major component and steam 72 with the methane reforming catalyst 56 while heating the reforming material by the combustion exhaust gas 62, a hydrogen separating device 54 for allowing inflow of the reformed gas 74 produced by the methane reforming device 53 to its inside for selectively separating hydrogen in the reformed gas 74 into hydrogen fuel 75 containing hydrogen as a major component and a residual gas 76 containing carbon dioxide, a carbon dioxide fixing device 55 for fixing carbon dioxide in the residual gas 76 separated by the hydrogen separating device 54 not so as to discharge it in a gas state to the outside, and a fuel cell 57 for the power generation by reacting hydrogen for the fuel cell 77 containing hydrogen fuel 75 separated by the hydrogen separating device 54 and oxygen or air.

Then, according to the firing furnace 200 of this embodiment, since the methane reforming reaction by the methane reforming device 53 is carried out while utilizing the heat of the combustion exhaust gas 62, the heat of the combustion exhaust gas 62 can be reused effectively. Moreover, the carbon dioxide fixing device 55 is so constructed that it allows inflow of sodium hydroxide as a fixing agent 91 to contact it with the residual gas 76 in the inside thereof, and make carbon dioxide contained in the residual gas 76 absorbed in the fixing agent 91 so as to produce sodium carbonate and it discharges the waste liquid 92 containing sodium carbonate to the outside thereof. Then, the unreacted gas is exhausted to the outside as a carbon dioxide fixing device exhaust gas 94. Moreover, the fixing agent 91 is not particularly limited as long as it can react with carbon dioxide or absorb carbon dioxide, and NaOH, $Mg(OH)_2$, or the like can be presented. Moreover, the devices are connected with a predetermined piping system such that the fuels, steam, or the like flow and move in the piping system.

Accordingly, since the firing furnace 200 of this embodiment comprises the fuel cell 7 for the power generation using hydrogen for the fuel cell 77 containing hydrogen fuel 75, the heat energy of the combustion exhaust gas 62 can be converted efficiently to the electric energy. That is, by generating the reformed gas 74 containing hydrogen by the methane reforming device 53 using the heat of the combustion exhaust gas 62, separating hydrogen fuel 75 from the reformed gas 74 by the hydrogen separating device 54, and using the total amount of the separated hydrogen fuel 75 as hydrogen for the fuel cell 77 by the fuel cell 57 for the power generation, the heat energy of the combustion exhaust gas 62 is converted efficiently to the electric energy having a higher utilization value. The fuel cell 57 is for the power generation by reacting hydrogen (hydrogen for the fuel cell) and oxygen or air. Since hydrogen fuel 75 used as hydrogen for the fuel cell 77 has high hydrogen purity, the power can be generated efficiently. For example, in the case of the power generation by an ordinary fuel cell using hydrogen, the electric power efficiency is about 40%, however, according to the fuel cell 7 used in this embodiment, the electric power efficiency can be dramatically as high as 60 to 70%. According to the firing furnace of this embodiment, the reformed gas 74 may be used directly by the fuel cell 57 without passing through the hydrogen separating device 54. As far as the exhausting amount of carbon dioxide gas is concerned, the fuel cell has an efficiency for converting the thermal energy to the electric energy about 2 times as high as that of the thermal power generation, or the like. Therefore, by using the electric power derived from the fuel cell instead of the electric power derived from the thermal power generation, or the like for the reduction of the carbon dioxide exhaust amount, the carbon gas cutback amount can be reduced to the half with respect to the same electric power amount. Therefore, carbon dioxide to be generated can be cut back without particularly fixing carbon dioxide. By fixing carbon dioxide, a further high carbon dioxide cutback effect can be achieved.

According to the firing furnace 200 of this embodiment, since carbon dioxide to be produced at the time of reacting the reforming material 23 with the methane reforming catalyst 6 is fixed by the carbon dioxide fixing device 5, carbon dioxide produced from the reforming material 23 can be prevented from discharging in a gas state to the outside thereof. Here, as the heat source for the methane reforming reaction, in addition to the combustion exhaust gas, the heat discharged from the furnace wall or the heat wasted at the time of cooling down the furnace tools used at the time of firing the ceramics can be used as well so that the heat can be collected further effectively.

According to the firing furnace 200 of this embodiment, since a combustible substance such as carbon monoxide, or the like may be contained in the residual gas 76, in the case such a combustible substance is contained, a part or the entirety of the residual gas 76 may be combusted by the combusting means 52. Since the fuel can be collected, it is preferable.

It is preferable to construct the firing furnace main body 51, the combusting means 52, the methane reforming device 53, the hydrogen separating device 54, the carbon dioxide fixing device 55 and the fuel cell 57 in the firing furnace 200 of this embodiment shown in FIG. 2 so as to have the same configuration as the firing furnace main body 1, the combusting means 2, the methane reforming device 3, the hydrogen separating device 4, the carbon dioxide fixing device 5 and the fuel cell 7 in the above-mentioned embodiment of the firing furnace of the present invention shown in FIG. 1. Thereby, the same effect can be obtained. However, it is preferable that the fuel containing methane 61 contains methane as a major component, and the combusting means 52 is one capable of efficiently combusting the fuel containing methane as a major component 61. Here, "containing methane as a major component" denotes that the content ratio of methane is 80 (% by volume) or more. Moreover, according to the firing furnace 200 of this embodiment, since the total amount of the fuel cell 75 is used for the power generation in the fuel cell 57, a piping for dividing to mix a part of hydrogen fuel 75 with the fuel 61, or the like is not needed.

The firing furnace 200 according to this embodiment shown in FIG. 2 can be used preferably as a firing furnace for firing a ceramic requiring the quantity of heat of 1,000,000 to 100,000,000 (kJ/Hr) at the time of firing. Moreover, as a member to be fired, as in the case of the above-mentioned embodiment of the firing furnace of the present invention, a ceramic honeycomb structure can be fired preferably.

Figure 3:
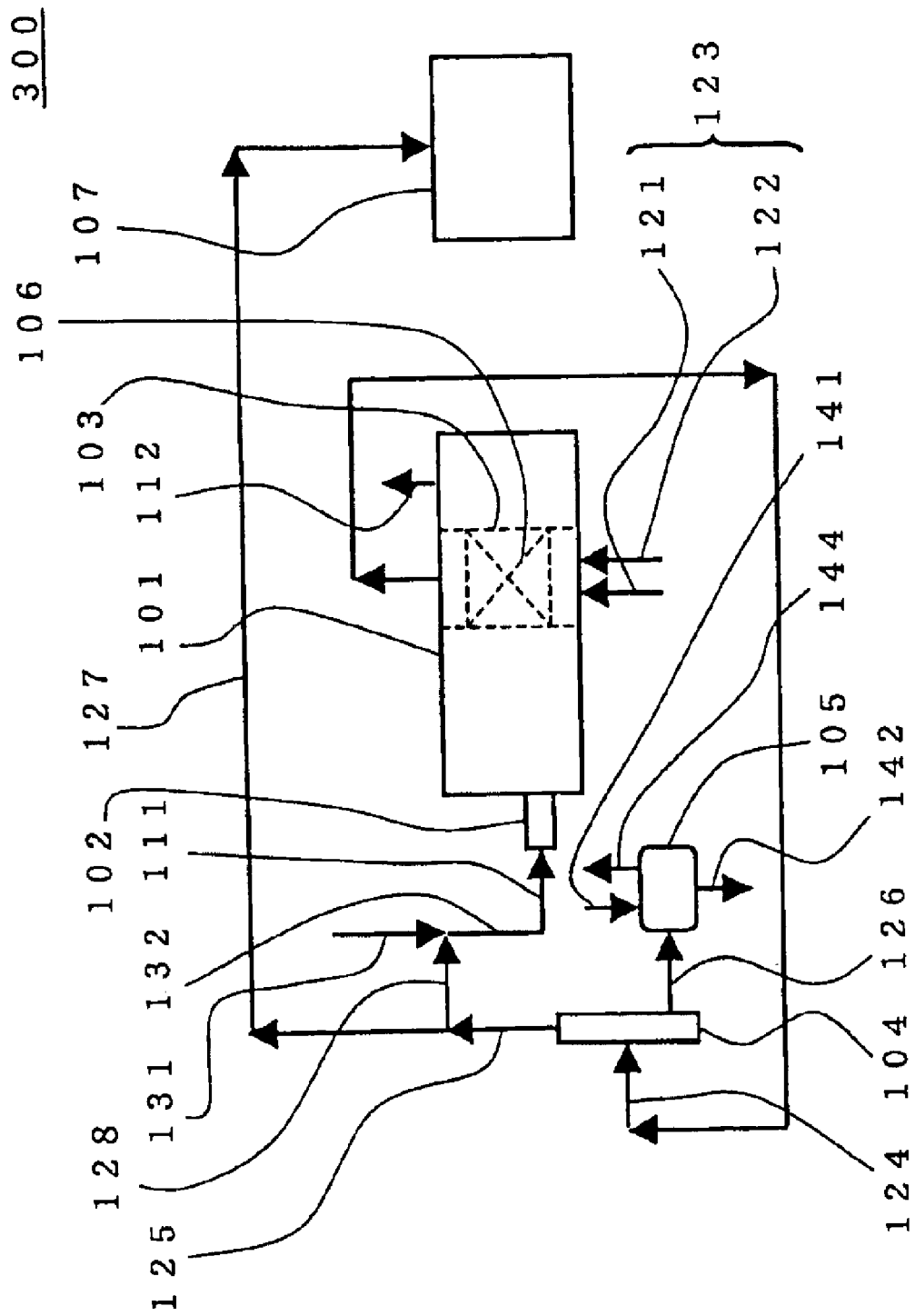
FIG. 3 is a block flow chart schematically showing still another embodiment of a firing furnace of the present invention.

Next, still another embodiment of the firing furnace of the present invention will be explained with reference to the drawings. FIG. 3 is a block flow chart schematically showing the firing furnace of this embodiment. Then, in FIG. 3, the arrows show the moving state of the fuels, the combustion exhaust gas, steam, the other substances, or the like.

As shown in FIG. 3, the firing furnace 300 of this embodiment comprises a combusting means 102 for combusting a fuel 111 containing methane flown therein for generating a combustion gas, and a firing furnace main body 101 for heating and firing the member to be fired conveyed to its inside by the combustion gas and exhausting the combustion gas after firing to the outside as the combustion exhaust gas 112 containing carbon dioxide (the combustion gas exhausted to the outside). It further comprises a methane reforming device 103 provided in the firing furnace main body 101 and filled with a methane reforming catalyst 106 in the inside for producing a reformed gas 124 (for executing the methane reforming reaction) containing hydrogen and carbon dioxide by making methane in the reforming material 123 react with steam 122 by contacting a reforming material 123 composed of a methane sub fuel for reformation 121 containing methane flown therein as a major component and steam 122 with the methane reforming catalyst 106 while heating the reforming material by the combustion gas generated by the combustion of the fuel 111, a hydrogen separating device 104 for allowing inflow of the reformed gas 124 produced by the methane reforming device 103 to its inside for selectively separating hydrogen in the reformed gas 124 into hydrogen fuel 125 containing hydrogen as a major component and a residual gas 126 containing carbon dioxide, and a carbon dioxide fixing device 105 for fixing carbon dioxide in the residual gas 126 separated by the hydrogen separating device 104 not so as to discharge it in a gas state to the outside.

According to the firing furnace of this embodiment, since the methane reforming device 103 is provided in the firing furnace main body 101 for producing the reformed gas 124 by contacting the reforming material 123 with the methane reforming catalyst 106 while being heated by the combustion gas instead of the combustion exhaust gas 112, the heat of the combustion gas can be used directly in the firing furnace main body 1 so that the heat of the combustion gas can be utilized effectively with little loss. Compared with the case of, for example, collecting the heat by an appliance installed outside the firing furnace main body 1 after exhausting the combustion gas once to the outside from the firing furnace main body 1, the loss of the heat energy of the combustion gas due to the discharge of heat, or the like can be reduced remarkably. Thereby, the total amount of the fuel to be used can be cut back so that the energy resource can be utilized efficiently.

Then, according to the firing furnace 300 of this embodiment, since the combusting means 102 generates the combustion gas by combusting the fuel mixture 132 of the methane main fuel for mixture 131 containing methane flown therein as a major component and hydrogen fuel 125 (hydrogen fuel for mixture 128) separated by the hydrogen separating device 104, that is, by using the fuel mixture 132 as the fuel containing methane 111, the amount of carbon dioxide contained in the combustion exhaust gas 112 can be reduced so that the exhaust amount of carbon dioxide to the outside can be reduced. Moreover, the carbon dioxide fixing device 105 allows inflow of sodium hydroxide as a fixing agent 141 to contact the fixing agent and the residual gas 126 in the inside thereof, and make carbon dioxide contained in the residual gas 126 absorbed by the fixing agent 141 so as to produce sodium carbonate, and it discharges the waste liquid 142 containing sodium carbonate to the outside thereof. Then, the unreacted gas is exhausted to the outside as an exhaust gas 144 from the carbon dioxide fixing device. Here, in the methane main fuel for mixture 131 containing methane as a major component, "containing methane as a major component" denotes that the content ratio of methane is 80 (% by volume) or more. Moreover, the fixing agent 141 is not particularly limited as long as it can react with carbon dioxide or absorb carbon dioxide, and NaOH, $Mg(OH)_2$, or the like can be illustrated. Moreover, the devices are connected with a predetermined piping system such that the fuels, steam, or the like flow and move in the piping system.

According to the firing furnace 300 of this embodiment, since the fuel mixture 132 of the methane main fuel for mixture 131 and hydrogen fuel 125 (hydrogen fuel for mixture 128) is used as the fuel containing methane 111 to be combusted by the combusting means 102, the formation of carbon dioxide can be reduced by virtue of hydrogen contained therein, which does not form carbon dioxide by the combustion (hydrogen fuel 125) of the fuel mixture 132 (fuel 111). Moreover, since carbon dioxide being produced at the time of reacting the above-mentioned reforming material 123 with the methane reforming catalyst 106 is fixed by the carbon dioxide fixing device 105, the discharge to the outside in a gas state of carbon dioxide produced from the reforming material 123 can be prevented. Furthermore, since the quantity of heat of the combustion gas in the firing furnace main body 101 (the combustion heat of the fuel 111) is used as the quantity of heat needed for the endothermic reaction at the time of reacting the above-mentioned reforming material 123 with the methane reforming catalyst 106, a part of the quantity of heat of the combustion gas can be collected and utilized again effectively as the combustion heat of the fuel 111, and thereby the total amount of the fuel to be used can be cut back. Here, the heat of the combustion gas as the heat source for the methane reforming reaction is the combustion heat of the fuel 111, including the discharged heat at the time of combusting the fuel 111 or the heat discharged from the furnace wall. Moreover, the heat wasted at the time of cooling down the furnace tools used at the time of firing the ceramics, or the like can be used as well.

As shown in FIG. 3, the firing furnace 300 of this embodiment further comprises a fuel cell 107. The hydrogen fuel 125 obtained by the separation by the hydrogen separating device 104 is divided into a part as hydrogen for the fuel cell 127 so as to be used in the fuel cell 107 for the power generation. Since hydrogen fuel 125 is high in hydrogen purity, the power generation can be done efficiently by the fuel cell 107.

The hydrogen fuel 125 may be used as hydrogen fuel for mixture 128 for the entirety, or it may be used as hydrogen fuel for mixture 128 and hydrogen for the fuel cell 127 separately. The ratio of separating the same into hydrogen fuel for mixture 128 and hydrogen for the fuel cell 127 is not particularly limited, and it may be separated so as to balance the carbon dioxide exhaust amount and the power generation amount optionally to the optimum values.

According to the firing furnace of this embodiment, the reformed gas 124 may be used directly by the fuel cell 107 without passing through the hydrogen separating device 104.

Figure 5:
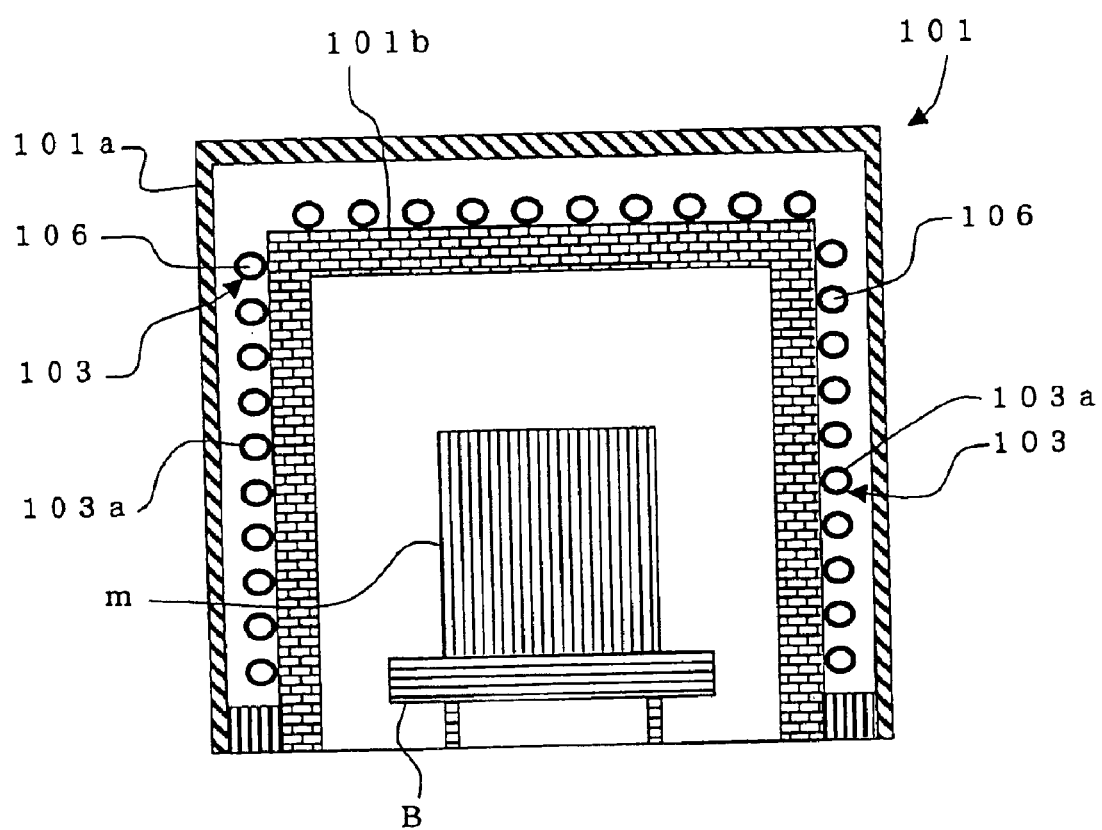
FIG. 5 is a cross sectional view schematically showing a firing furnace main body used for still another embodiment of a firing furnace of the present invention taken in a plane vertical to the longitudinal direction thereof.
Figure 6:
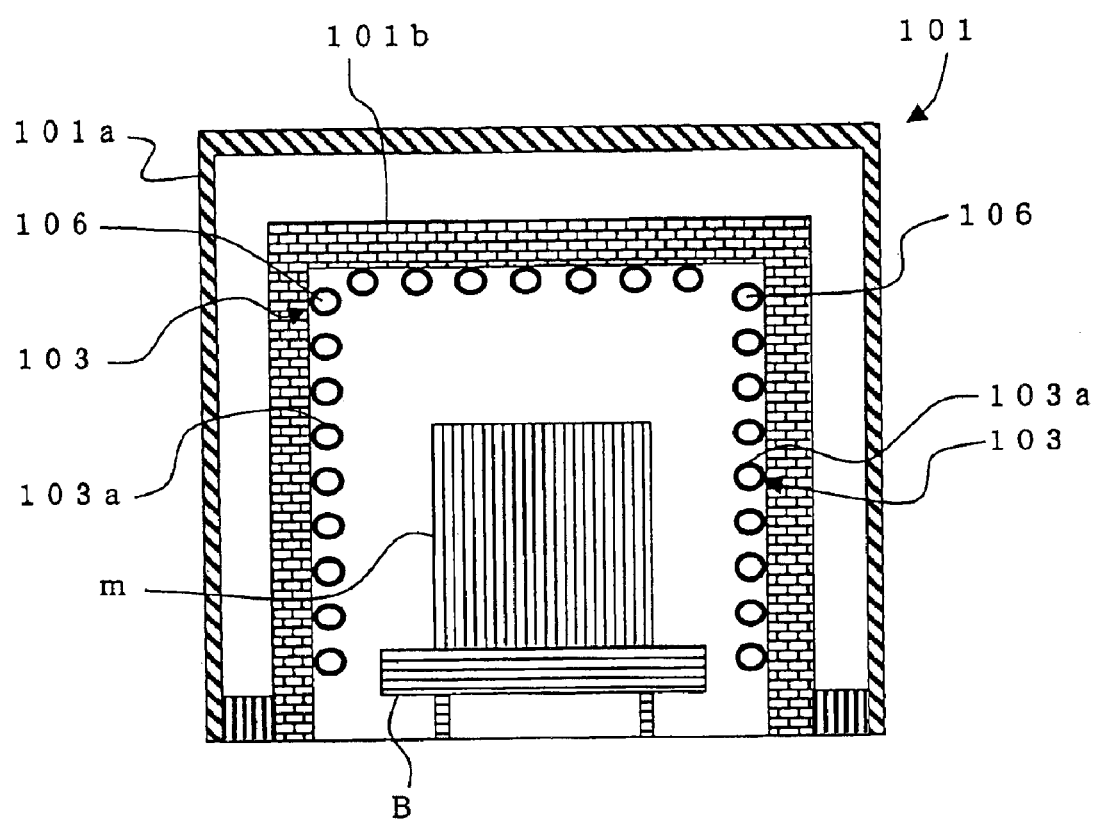
FIG. 6 is a cross sectional view schematically showing a firing furnace main body used for still another embodiment of a firing furnace of the present invention taken in a plane vertical to the longitudinal direction thereof.

FIG. 5 schematically shows the firing furnace main body 101 comprising the firing furnace 300 of this embodiment as a cross sectional view taken on the plane perpendicular to the longitudinal direction thereof. The firing furnace main body 101 shown in FIG. 5 is a firing furnace main body 101 of continuous type, and the longitudinal direction thereof is the direction of conveying and moving a member m to be fired in the firing furnace main body 101. The member m to be fired is formed so as to move in the firing furnace main body 101 along the longitudinal direction by a belt conveyor B. As shown in FIG. 5, the firing furnace main body 101 has an embodiment provided with the methane reforming device 3 along the inner surface of the outer circumferential wall 101a thereof, however, it may be provided in the inside of the inner side furnace wall 101b, that is, in a space for firing the member m to be fired by the combustion gas as shown in FIG. 6. Moreover, it may be provide at both of them. Moreover, in the cross section of the firing furnace main body 101 shown in FIG. 5, it is preferable that the methane reforming device 3 is provided at a position for obtaining the optimum temperature for carrying out the methane reforming reaction in the temperature distribution in the entire cross section. Moreover, as to the position for providing the methane reforming device 103 in the longitudinal direction of the firing furnace main body 101, a position capable of obtaining the temperature suited for the methane reforming reaction in the temperature distribution in the firing furnace main body 101 is preferable. Moreover, for having the optimum temperature state of the position for providing the methane reforming device 103, as shown in FIG. 5, it is preferable that a space for providing the methane reforming device 103 and a space for firing the member m to be fired m by the combustion gas are partitioned by an inner side furnace wall 101b. By partitioning the inside of the firing furnace main body 101 by the inner side furnace wall 101b, the direct contact of the combustion gas with the methane reforming device 103 can be prevented or it can hardly be contacted therewith, and thus the quantity of heat conducted to the methane reforming device 103 can be adjusted further appropriately so that the temperature of the methane reforming device 103 can be provided more appropriately. This is effective at the time of providing the methane reforming device 103 in the high temperature area of the firing furnace main body 101.

The methane reforming device 103 is formed with a cylindrical reforming reaction pipe 103a filled with the methane reforming catalyst 106. The methane reforming device 103 has the both end parts of the reforming reaction pipe 103a communicating with the outside of the firing furnace main body 101 such that the reforming material can be flown therein from one end part for carrying out the methane reforming reaction in the firing furnace main body 101 by the heat of the combustion gas and the methane reforming catalyst and the obtained reformed gas can be flown out from the other end part of the reforming reaction pipe 103a to the outside of the firing furnace main body 101.

As a container to be filled with the methane reforming catalyst 106, although the pipe like reforming reaction pipe shown in FIG. 5 is used in this embodiment, the shape of the container is not limited to the pipe like (cylindrical), it may be box like or any other shape capable of being filled with the methane reforming catalyst 106 in the inside and installed in the firing furnace main body 101 for carrying out the methane reforming reaction by the combustion gas.

It is preferable that the firing furnace main body 101, the combusting means 102, the methane reforming device 103, the hydrogen separating device 104, the carbon dioxide fixing device 105 and the fuel cell 107 in the firing furnace 300 of this embodiment shown in FIG. 3 have the same configuration as the firing furnace main body 1, the combusting means 2, the methane reforming device 3, the hydrogen separating device 4, the carbon dioxide fixing device 5 and the fuel cell 7 in the above-mentioned embodiment of the firing furnace of the present invention shown in FIG. 1 except that the methane reforming device 103 is provided in the firing furnace main body 101. Thereby, the same effect can be obtained.

Moreover, although the methane reforming device is provided in the firing furnace main body in the firing furnace of this embodiment, a methane reforming device to be provided outside the firing furnace main body as the methane reforming device in the above-mentioned embodiment of the firing furnace of the present invention shown in FIG. 1 may be further provided. That is, the methane reforming devices are provided inside and outside the firing furnace main body so that the methane reformation is carried out utilizing the heat of the combustion gas in the inside and the methane reformation is carried out utilizing the heat of the combustion exhaust gas at the outside.

Figure 4:
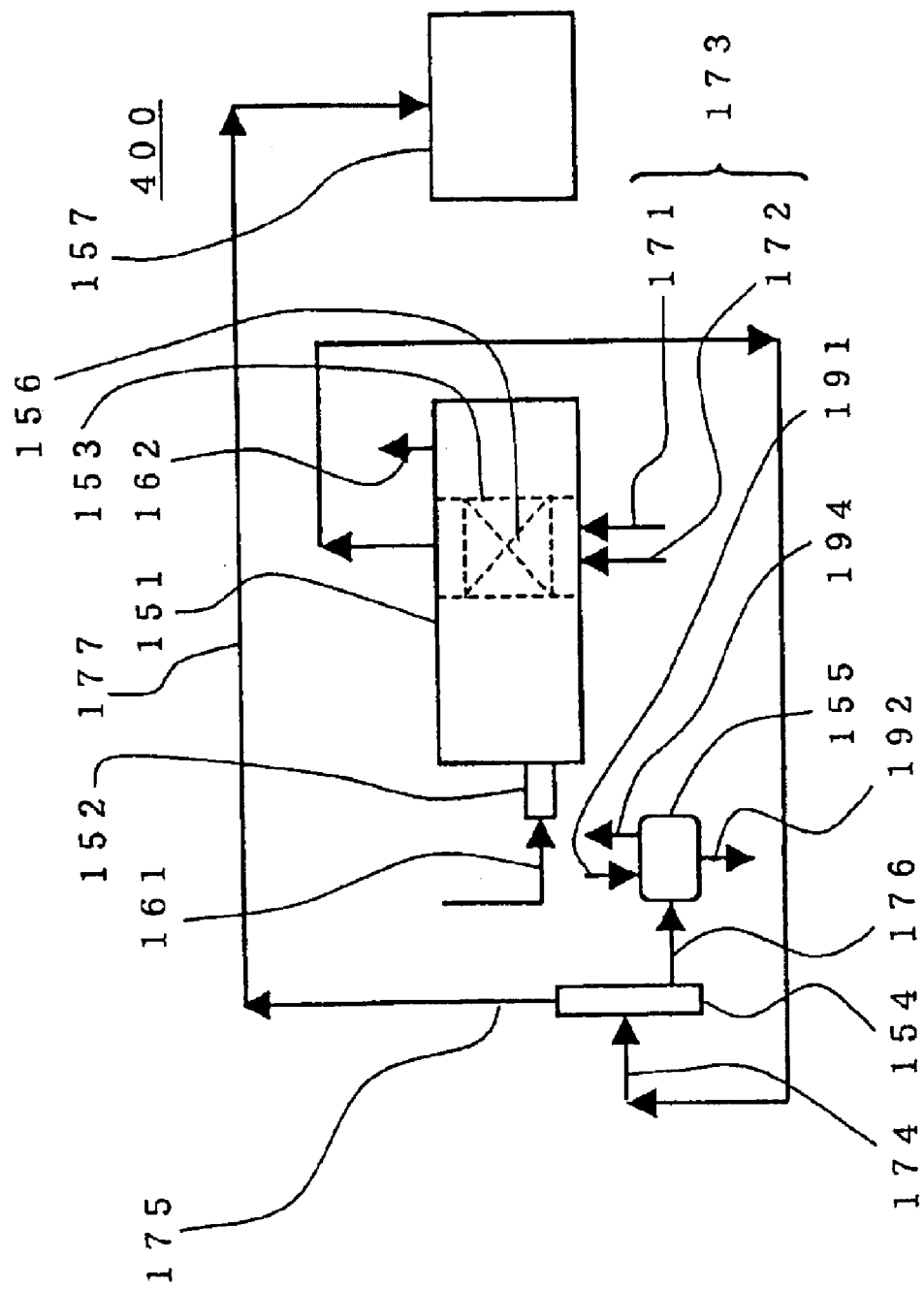
FIG. 4 is a block flow chart schematically showing still another embodiment of a firing furnace of the present invention.

Next, still another embodiment of the firing furnace of the present invention will be explained with reference to the drawings. FIG. 4 is a block flow chart schematically showing the firing furnace of the still another embodiment. Then, in FIG. 4, the arrows show the moving state of the fuels, the combustion exhaust gas, steam, the other substances, or the like.

As shown in FIG. 4, the firing furnace 400 of this embodiment comprises a combusting means 152 for combusting a fuel 161 containing methane flown therein for generating a combustion gas, and a firing furnace main body 151 for heating and firing the member to be fired conveyed to its inside by the combustion gas and exhausting the combustion gas after firing to the outside as the combustion exhaust gas 162 containing carbon dioxide. It further comprises methane reforming device 153 provided in the firing furnace main body 151 and filled with a methane reforming catalyst 156 in the inside for producing a reformed gas 174 (for performing the methane reforming reaction) containing hydrogen and carbon dioxide by reacting methane in the reforming material 173 and steam 172 by contacting a reforming material 173 composed of a methane sub fuel for reformation 171 containing methane flown therein as a major component and steam 172 with the methane reforming catalyst 156 while heating the reforming material by the combustion gas; a hydrogen separating device 154 for allowing inflow of the reformed gas 174 produced by the methane reforming device 153 to its inside for selectively separating hydrogen in the reformed gas 174 into hydrogen fuel 175 containing hydrogen as a major component and a residual gas 176 containing carbon dioxide; a carbon dioxide fixing device 155 for fixing carbon dioxide in the residual gas 176 separated by the hydrogen separating device 154 not so as to discharge it to the outside in a gas state; and a fuel cell 157 for the power generation by reacting hydrogen for the fuel cell 177 containing hydrogen fuel 175 separated by the hydrogen separating device 154 and oxygen or air. The devices are connected with a predetermined piping system such that the fuels, steam, or the like flow and move in the piping system. The gas not fixed by the carbon dioxide fixing device 155 is discharged to the outside as the carbon dioxide fixing device exhaust gas 194.

According to the firing furnace 400 of this embodiment, since the methane reforming device 153 is provided in the firing furnace main body 151, the heat of the combustion gas can be utilized effectively by executing the methane reforming reaction while using a part of the heat of the combustion gas in the firing furnace main body 151. Then, since the firing furnace 400 of this embodiment comprises the fuel cell 157 for the power generation using hydrogen for the fuel cell 177 containing hydrogen fuel 175, a part of the heat energy of the combustion gas can be converted efficiently to the electric energy. That is, by generating the reformed gas 174 containing hydrogen by the methane reforming device 153 using the heat of the combustion gas, separating hydrogen fuel 175 from the reformed gas 174 by the hydrogen separating device 154 and using the entire amount of the separated hydrogen fuel 175 as hydrogen for the fuel cell 177 for the power generation by the fuel cell 157, a part of the heat energy of the combustion gas can be converted efficiently to the electric energy with a higher utilization value. The fuel cell 157 is for the power generation by reacting hydrogen (hydrogen for the fuel cell) and oxygen or air. Since the fuel cell 175 used as hydrogen for the fuel cell 177 has high hydrogen purity, the power generation can be carried out efficiently. For example, in the case of the power generation by the fuel cell using an ordinary hydrogen, the electric power efficiency is about 40%, however, according to the fuel cell 157 used in this embodiment, the electric power efficiency can be dramatically as high as 60 to 70%. According to the firing furnace of this embodiment, the reformed gas 174 may be used directly by the fuel cell 157 without passing through the hydrogen separating device 154. As to the carbon gas exhausting amount, the fuel cell has the efficiency for converting the heat energy to the electric energy about 2 times as high as that of the thermal power generation, or the like. Therefore, by using the electric power derived from the fuel cell instead of the electric power derived from the thermal power generation, or the like for the reduction of the carbon dioxide exhaust amount, the carbon gas cutback amount can be reduced to the half with respect to the same electric power amount. Therefore, carbon dioxide to be generated can be cut back without particularly fixing carbon dioxide. By fixing carbon dioxide, a higher carbon dioxide cutback effect can be achieved.

It is preferable that the firing furnace main body 151, the combusting means 152, the methane reforming device 153, the hydrogen separating device 154, the carbon dioxide fixing device 155 and the fuel cell 157 in the firing furnace 400 of this embodiment shown in FIG. 4 have the same configuration as the firing furnace main body 1, the combusting means 2, the methane reforming device 3, the hydrogen separating device 4, the carbon dioxide fixing device 5 and the fuel cell 7 in the above-mentioned embodiment of the firing furnace of the present invention shown in FIG. 1 except that the methane reforming device 153 is provided in the firing furnace main body 151. Thereby, the same effect can be obtained. Then, as the structure for providing the methane reforming device 153 in the inside of the firing furnace main body 151, the same configuration of the firing furnace main body 101 shown in FIG. 5 or 6 is preferable. Thereby, the same effect can be obtained. However, it is preferable that the fuel containing methane 161 contains methane as a major component, and the combusting means 152 is one capable of efficiently combusting the fuel containing methane as a major component 161.

Next, an embodiment of the firing method of the present invention will be explained with reference to FIG. 1 showing the above-mentioned embodiment of the firing furnace of the present invention.

As the firing furnace 100 to be used for the firing method of this embodiment, the above-mentioned embodiment of the firing furnace of the present invention, which has been explained with reference to FIG. 1 can be used preferably. The firing method of this embodiment is a firing method comprising the steps of generating a combustion gas by flowing a fuel containing methane 11 into a combusting means 2 and combusting, introducing the combustion gas generated in the combusting means 2 into the inside of a firing furnace main body 1, heating and firing a member to be fired conveyed into its inside by the combustion gas, and exhausting the combustion gas after firing to the outside. Furthermore, a reforming material 23 composed of a methane sub fuel for reformation 21 containing methane flown therein as a major component and steam 22 is flown into a methane reforming device 3 filled with a methane reforming catalyst 6 in the inside, and contacting the reforming material 23 with the methane reforming catalyst 6 while heating by the combustion exhaust gas 12 gas so as to react methane in the reforming material 23 with steam 22 for producing a reformed gas 24 containing hydrogen and carbon dioxide.

According to the firing method of this embodiment, since the methane reforming reaction in the methane reforming device 3 is carried out while using the heat of the combustion gas (combustion exhaust gas 12) discharged to the outside of the firing furnace main body 1, the heat of the combustion exhaust gas 12 can be utilized again effectively.

Furthermore, according to the firing method of this embodiment, by separating the reformed gas 24 produced by the methane reforming device 3 into hydrogen fuel 25 containing hydrogen as a major component and the residual gas 26 containing carbon dioxide by selectively separating hydrogen in the reformed gas 24 by flowing the same into the inside of the hydrogen separating device 4, flowing the residual gas 26 separated by the hydrogen separating device 4 into the carbon dioxide fixing device 5, fixing carbon dioxide in the residual gas 26 by the fixing agent 41 not so as to discharge it to the outside in a gas state, and flowing the fuel mixture 32 of the methane main fuel for mixture 31 containing methane as a major component and hydrogen fuel 25 (hydrogen fuel for mixture 28) separated by the hydrogen separating device 4 in the combusting means 2 so as to be combusted for generating the combustion gas, the amount of carbon dioxide contained in the combustion exhaust gas 12 can be reduced. Thereafter, the combustion exhaust gas 12 used in the methane reforming device 3 is discharged to the outside as the reforming device exhaust gas 43. Moreover, after fixing carbon dioxide by the fixing agent 41, it is discharged to the outside as the waste liquid 42.

Here, in the methane main fuel for mixture 31 containing methane as a major component, "containing methane as a major component" denotes that the content ratio of methane is 80 (% by volume) or more. Moreover, in hydrogen fuel 25 containing hydrogen as a major component, "containing hydrogen as a major component" denotes that the content ratio of hydrogen is 50 (% by volume) or more.

According to the firing method of this embodiment, since the fuel mixture 32 of the methane main fuel for mixture 31 and the hydrogen fuel 25 (hydrogen fuel for mixture 28) is used as the fuel 11 containing methane to be combusted by the combusting means 2, the generation of carbon dioxide can be reduced for the content of hydrogen (hydrogen fuel for mixture 28) not to generate carbon dioxide by the combustion of the fuel mixture 32 (fuel 11). At the time, the content ratio of hydrogen contained in the fuel mixture 32 (hydrogen/fuel mixture) is preferably 5 to 95 (% by volume), and it is further preferably 25 to 75 (% by volume). In the case it is less than 5 (% by volume), the carbon dioxide reducing effect may not be sufficient. In the case it is more than 95 (% by volume), at the time of executing the methane reforming reaction, not only the combustion exhaust gas, another heat source may be needed. Moreover, carbon dioxide to be produced at the time of reacting the reforming material 23 with the methane reforming catalyst 6 is fixed by the carbon dioxide fixing device 5, the discharge to the outside in a gas state of carbon dioxide produced from the reforming material 23 can be prevented. Furthermore, since the quantity of heat of the combustion exhaust gas 12 exhausted from the firing furnace main body 1 is used as the quantity of heat needed for the endothermic reaction at the time of reacting the reforming material 23 with the methane reforming catalyst 6, a part of the exhaust heat of the combustion exhaust gas 12 can be collected effectively as the combustion heat of the fuel, and thus the total use amount of the fuel can be cut back.

As shown in FIG. 1, the firing furnace 100 used for the firing method of this embodiment further comprises a fuel cell 7 so that a part of hydrogen fuel 25 can be used as hydrogen for the fuel cell 27 for the power generation. The fuel cell 7 is for the power generation by reacting hydrogen (hydrogen for the fuel cell) and oxygen or air. According to the firing method of this embodiment, a part of hydrogen fuel 25 obtained by the separation by the hydrogen separating device 4 can be separated as hydrogen for the fuel cell 27 so as to be used in the fuel cell 7 for the power generation. Since hydrogen fuel 25 is high in the hydrogen purity, the power generation can be done efficiently by the fuel cell 7 by using a part thereof as hydrogen for the fuel cell 27. For example, in the case of the power generation by the fuel cell using an ordinary hydrogen, the electric power efficiency is about 40%, however, according to the power generation by the fuel cell 7 in this embodiment, the electric power efficiency can be dramatically improved to 60 to 70%. Moreover, by combusting a part of hydrogen fuel 25 separated and obtained by the hydrogen separating device 4 finally by the combusting means 2 as hydrogen fuel for mixture 28 and utilizing the remainder thereof as hydrogen for the fuel cell 27 for the power generation by the fuel cell 7, the carbon dioxide amount contained in the combustion exhaust gas 12 can be reduced, and at the same time, the heat of the combustion exhaust gas 12 can be collected effectively so as to be utilized for the power generation, and thus the electric energy with a high utilization value can be obtained.

As to the carbon gas exhausting amount, the fuel cell has the efficiency for converting the heat energy to the electric energy about 2 times as high as that of the thermal power generation, or the like. Therefore, by using the electric power derived from the fuel cell instead of the electric power derived from the thermal power generation, or the like for the reduction of the carbon dioxide exhaust amount, the carbon gas cutback amount can be reduced to the half with respect to the same electric power amount. Therefore, carbon dioxide to be generated can be cut back without particularly fixing carbon dioxide. By fixing carbon dioxide, a higher carbon dioxide cutback effect can be generated.

The hydrogen fuel 25 may be used as hydrogen fuel for mixture 28 for the entirety, or it may be used as hydrogen fuel for mixture 28 and hydrogen for the fuel cell 27 separately. The ratio of separating the same into hydrogen fuel for mixture 28 and hydrogen for the fuel cell 27 is not particularly limited, and it may be separated so as to balance the carbon dioxide exhaust amount and the power generation amount optionally to the optimum values.

According to the firing furnace 100 used for the firing method of this embodiment shown in FIG. 1, it is preferable that the firing furnace main body 1 has the same configuration as in the case of the firing furnace main body in the above-mentioned firing furnace of the present invention. Thereby, the same effect can be obtained. Moreover, the firing furnace main body 1 may be of the batch system of firing intermittently a predetermined amount of members to be fired each time, however, it is preferably a firing furnace main body 1 of continuous type for continuously conveying into its inside a member to be fired such as a ceramic honeycomb structure, and conveying the same continuously to the outside thereof after heating and firing the member to be fired in the inside. Since the combustion exhaust gas 12 can be exhausted constantly and stably from the firing furnace main body 1 by firing continuously, the methane reforming reaction can be carried out stably by the heat of the combustion exhaust gas 12 in the methane reforming device 3, and thereby hydrogen fuel 25 can be supplied stably, and thus the fuel mixture 32 obtained by mixing hydrogen fuel 25 and the methane main fuel for mixture 31 can be supplied stably to the combusting means 2.

Moreover, as the member to be fired by the firing method of this embodiment, a ceramic such as table wares, a tile, a sanitary earthenware and an insulator, and furthermore, a ceramic honeycomb structure can be fired preferably. Here, the ceramic honeycomb structure refers to a ceramic structure of a honeycomb structure having a plurality of cells to be the channel for a fluid, partitioned by a partition wall.

It is preferable that the combusting means 2, the methane reforming device 3, the hydrogen separating device 4 and the carbon dioxide fixing device 5 in the firing furnace 100 used for the firing method of this embodiment shown in FIG. 1 have the same configuration as the combusting means 2, the methane reforming device 3, the hydrogen separating device 4 and the carbon dioxide fixing device 5 in the above-mentioned embodiment of the firing furnace of the present invention. Thereby, the same effect can be obtained. Also in the case of using the carbon dioxide fixing device as the sodium carbonate producing device, it is provided preferably as in the case of using the carbon dioxide fixing device as the sodium carbonate producing device in the above-mentioned embodiment of the firing furnace of the present invention.

According to the firing method of this embodiment, as in the case of firing using the above-mentioned embodiment of the firing furnace of the present invention, as the fuel to be combusted in the combusting means 2, the fuel mixture 32 of the methane main fuel for mixture 31 containing methane as a major component and hydrogen fuel 25 (hydrogen fuel for mixture 28) separated by the hydrogen separating device 4 is used. Since the combustion exhaust gas 12 is not discharged constantly (the state with the combustion exhaust gas 12 not yet generated or the state of gradual increment of the gas) at the time of starting the operation of the firing furnace 100 and thus it is difficult to execute the reaction by the methane reforming device 3 while using the combustion exhaust gas 12, the fuel mixture 32 may be used after constantly discharging the combustion exhaust gas 12. In this case, at the time of starting the operation of the firing furnace 100, the firing operation is executed only with the methane main fuel for mixture 31 containing methane as a major component. Moreover, in the case the combustion exhaust gas 12 is not constantly discharged at the time of starting, another heating device by steam, the electricity, or the like (not shown) may be provided in the methane reforming device 3 for operating the methane reforming device 3 while using the heating device.

The firing method according to this embodiment can be used at the time of firing a ceramic by the quantity of heat of 1,000,000 to 100,000,000 (kJ/Hr). In the case of equipment of lower than 1,000,000 (kJ/Hr), combining several sets of the small size equipment can be used for the present invention. Although the equipment of 1,000,000 (kJ/Hr) or less can be adopted for the present invention, it is not economical in the present situation wherein the methane steam reforming equipment is expensive.

According to the firing method of this embodiment, as in the case of firing using the above-mentioned embodiment of the firing furnace of the present invention, the volume ratio of the methane sub fuel for reformation 121 and the methane main fuel for mixture 131 (the methane sub fuel for reformation 121: the methane main fuel for mixture 131) is preferably 5:95 to 100:0 (volume ratio). In the case the ratio of the methane sub fuel for reformation 121 is less than 5 (volume ratio), carbon dioxide may not be cut back sufficiently. Moreover, at least one of the methane main fuel for mixture 131 and the methane sub fuel for reformation 121 can be a liquefied natural gas (LNG). By using the LNG in this way, the combusting operation can be executed efficiently owing to the good combustion property of the LNG. Moreover, since the LNG is a clean and inexpensive fuel, the hazardous substances such as the sulfur oxide and the dusts are not generated by the combustion, and thus it is preferable.

Next, according to the difference of the fuel use amounts and the generated quantity of heat, and the difference of the generated carbon dioxide at the time of using the fuel mixture 32 of the methane main fuel for mixture 31 and hydrogen fuel 25 (hydrogen fuel for mixture 28) and combusting the same in the combusting means 2 (this embodiment) as the firing method of this embodiment and at the time of using only methane gas (a gas having the 100 (%) methane content ratio) as the fuel 11 and combusting the same in the combusting means 2 (comparative example), the same results as in the case of comparison for the above-mentioned embodiment of the firing furnace of the present invention can be obtained. That is, in the case only methane gas is combusted as the fuel 11, the quantity of heat of 39,800 (kJ/Hr) can be obtained for the use of 1 ($Nm^3/H$) methane gas. On the other hand, in the case of this embodiment, the quantity of heat to be obtained can be 40,380 (kJ/Hr) for the 0.9 ($Nm^3/Hr$) total methane gas use amount (the total of the methane main fuel for mixture 131 and the methane sub fuel for reformation 121). Moreover, since the carbon dioxide amount to be formed at the time of combusting 1 mole of methane gas is 1 mole (theoretical amount), in the case of the above-mentioned comparative example, 1 ($Nm^3/Hr$) of carbon dioxide is formed. On the other hand, in the case of this embodiment, 0.5 ($Nm^3/Hr$) of carbon dioxide is formed. Therefore, in the comparison of this embodiment and the case of the comparative example, the amount of methane gas used for having the quantity of heat to be generated by the combustion by the combusting means 102 substantially equally (that of this embodiment is slightly larger) can be cut back by 10% in the case of this embodiment with respect to the case of the comparative example. Furthermore, the carbon dioxide amount to be formed can be cut back by 50% in the case of this embodiment with respect to the case of the comparative example.

Next, another embodiment of the firing method of the present invention will be explained with reference to FIG. 2 showing the above-mentioned other embodiment of the firing furnace of the present invention.

As the firing furnace 200 to be used for the firing method of this embodiment, the above-mentioned other embodiment of the firing furnace of the present invention, which has been explained with reference to FIG. 2 can be used preferably. The firing method of this embodiment is a firing method comprising the steps of generating a combustion gas by flowing a fuel containing methane 61 into a combusting means 52 and combusting, introducing the combustion gas generated in the combusting means 52 into the inside of a firing furnace main body 51, heating and firing a member to be fired conveyed into its inside by the combustion gas, and exhausting the combustion gas after firing to the outside of the firing furnace main body 51. Furthermore, a reforming material 73 composed of a methane sub fuel for reformation 71 having methane flown therein as a major component and steam 72 is flown into a methane reforming device 53 filled with a methane reforming catalyst 56 in the inside, and contacting the reforming material 73 with the methane reforming catalyst 56 while heating the material by the combustion gas exhausted from the firing furnace main body 51 (the combustion exhaust gas 62) so as to react methane in the reforming material 73 with steam 72 for producing a reformed gas 74 containing hydrogen and carbon dioxide.

According to the firing method of this embodiment, since the methane reforming reaction in the methane reforming device 53 is carried out while using the heat of the combustion exhaust gas 62, the heat of the combustion exhaust gas 62 can be utilized again effectively.

Furthermore, according to the firing method of this embodiment, by separating the reformed gas 74 produced by the methane reforming device 53 into hydrogen fuel 75 containing hydrogen as a major component and the residual gas 76 containing carbon dioxide by selectively separating hydrogen in the reformed gas 74 by flowing the same into the inside of the hydrogen separating device 54, flowing the residual gas 76 separated by the hydrogen separating device 54 into the carbon dioxide fixing device 55, fixing carbon dioxide in the residual gas 76 by the fixing agent 91 not so as to discharge it to the outside in a gas state, and flowing hydrogen fuel 75 separated by the hydrogen separating device 54 into the fuel cell 57 as hydrogen for the fuel cell 77 for the power generation by the reaction of hydrogen for the fuel cell 77 and oxygen or air, the heat of the combustion exhaust gas 62 can be used for generating the reformed gas 74 containing hydrogen gas by the methane reforming device 53, separating hydrogen fuel 75 from the reformed gas 74 by the hydrogen separating device 54, using hydrogen fuel 75 for the power generation by the fuel cell 57 as hydrogen for the fuel cell 77, and converting the heat energy of the combustion exhaust gas 62 to the electric energy.

Thereafter, the combustion exhaust gas 62 used in the methane reforming device 53 is discharged to the outside as the reforming device exhaust gas 93. Moreover, after fixing carbon dioxide by the fixing agent 91, it is discharged to the outside as the waste liquid 92.

According to the firing method of this embodiment, since the total amount of hydrogen fuel 75 is used as hydrogen for the fuel cell 77 for the power generation by the fuel cell 57, the heat of the combustion exhaust gas 62 can be collected effectively so as to be utilized for the power generation, and thus the electric energy of a higher utilization value can be obtained. Since hydrogen fuel 75 is high in the hydrogen purity, by the use thereof as hydrogen for the fuel cell 77, the power generation can be done efficiently in the fuel cell 57. For example, in the case of the power generation by the fuel cell using an ordinary hydrogen, the electric power efficiency is about 40%, however, according to the power generation by the fuel cell 57 in this embodiment, the electric power efficiency can be improved dramatically to 60 to 70%.

Moreover, according to the firing method of this embodiment, since carbon dioxide to be produced at the time of reacting the above-mentioned reforming material 73 with the methane reforming catalyst 56 is fixed by the carbon dioxide fixing device 55, carbon dioxide produced from the reforming material 73 is not discharged to the outside in a gas state.

According to the firing furnace 200 used for the firing method of this embodiment shown in FIG. 2, it is preferable that the firing furnace main body 51 has the same configuration as in the case of the firing furnace main body 1 in the above-mentioned embodiment of the firing furnace of the present invention shown in FIG. 1. Thereby, the same effect can be obtained. Moreover, the firing furnace main body 51 may be of the batch system of firing intermittently a predetermined amount of members to be fired each time, however, it is preferably a firing furnace main body 51 of continuous type for continuously conveying into its inside a member to be fired such as a ceramic honeycomb structure, and conveying the same continuously to the outside thereof after heating and firing the member to be fired in the inside. Since the combustion exhaust gas 62 can be exhausted constantly and stably from the firing furnace main body 51 by firing continuously, the methane reforming reaction can be carried out stably by the heat of the combustion exhaust gas 62 in the methane reforming device 53, and thereby hydrogen fuel 75 can be supplied stably, and thus the power generation can be carried out stably by the fuel cell 57.

Moreover, as the member to be fired by the firing method of this embodiment, a ceramic such as a table ware, a tile, a sanitary earthenware and an insulator, and furthermore, a ceramic honeycomb structure can be fired preferably. Here, the ceramic honeycomb structure denotes a ceramic honeycomb structure having a plurality of cells to be the channel for a fluid, partitioned by partition walls.

It is preferable that the combusting means 52, the methane reforming device 53, the hydrogen separating device 54 and the carbon dioxide fixing device 55 in the firing furnace 200 used for the firing method of this embodiment shown in FIG. 2 have the same configuration as the combusting means 2, the methane reforming device 3, the hydrogen separating device 4 and the carbon dioxide fixing device, 5 in the above-mentioned embodiment of the firing furnace of the present invention shown in FIG. 1. Thereby, the same effect can be obtained. However, it is preferable that the fuel containing methane 61 contains methane as a major component, and the combusting means 52 is one capable of efficiently combusting the fuel containing methane as a major component 61. Here, "containing methane as a major component" denotes that the content ratio of methane is 80 (% by volume) or more.

According to the firing furnace 200 of this embodiment, since a combustible substance such as carbon monoxide, or the like may be contained in the residual gas 76, in the case such a combustible substance is contained, a part or the entirety of the residual gas 76 may be combusted by the combusting means 152. Since the fuel can be collected, it is preferable.

The firing method according to this embodiment can be used at the time of firing a ceramic by the quantity of heat of 1,000,000 to 100,000,000 (kJ/Hr). In the case of equipment of lower than 1,000,000 (kJ/Hr), one may use an apparatus obtained by combining several sets of the small size equipment for the present invention. Although the present invention can be applied to the equipment of 1,000,000 (kJ/Hr) or less, it is not economical in the present situation wherein the methane steam reforming equipment is expensive.

Next, still another embodiment of the firing method of the present invention will be explained with reference to FIG. 3 showing the above-mentioned still another embodiment of the firing furnace of the present invention.

As the firing furnace 300 to be used for the firing method of this embodiment, the above-mentioned still another embodiment of the firing furnace of the present invention, which has been explained with reference to FIG. 3 can be used preferably. The firing method of this embodiment is a firing method comprising the steps of generating a combustion gas by flowing a fuel containing methane 111 into a combusting means 102 and combusting, introducing the combustion gas generated in the combusting means 102 into the inside of a firing furnace main body 101, and heating and firing a member to be fired conveyed into its inside by the combustion gas. Furthermore, a reforming material 123 composed of a methane sub fuel for reformation 121 having methane flown therein as a major component and steam 122 is flown into a methane reforming device 103 provided in the firing furnace main body 101 and filled with a methane reforming catalyst 106 in the inside, and contacting the reforming material 123 with the methane reforming catalyst 106 while heating by the combustion gas so as to react methane in the reforming material 123 with steam 122 for producing a reformed gas 124 containing hydrogen and carbon dioxide.

According to the firing method of this embodiment, since the quantity of heat of the combustion gas is used in the firing furnace main body 101 as the quantity of heat necessary for the endothermic reaction at the time of reacting the above-mentioned reforming material 123 with the methane reforming catalyst 106, a part of the heat of the combustion gas can be collected and used again as the combustion heat of the fuel so that the total use amount of the fuel can be cut back.

Then, according to the firing method of this embodiment, by further separating the reformed gas 124 produced by the methane reforming device 103 into hydrogen fuel 125 containing hydrogen as a major component and the residual gas 126 containing carbon dioxide by selectively separating hydrogen in the reformed gas 124 by flowing the same into the inside of the hydrogen separating device 105, flowing the residual gas 126 separated by the hydrogen separating device 104 into the carbon dioxide fixing device 105, fixing carbon dioxide in the residual gas 126 by the fixing agent 141 not so as to discharge it to the outside in a gas state, and flowing the fuel mixture 132 of the methane main fuel 131 containing methane as a major component and hydrogen fuel 125 (hydrogen fuel for mixture 128) separated by the hydrogen separating device 104 into the combusting means 102, generating the combustion gas by combusting, the amount of carbon dioxide contained in the combustion gas can be reduced so that the amount of carbon dioxide contained in the combustion exhaust gas 112 to be discharged to the outside can be reduced. The combustion exhaust gas 112 is discharged to the outside. Moreover, after fixing carbon dioxide by the fixing agent 141, it is discharged to the outside as the waste liquid 142.

Here, in the methane main fuel for mixture 131 containing methane as a major component, "containing methane as a major component" denotes that the content ratio of methane is 80 (% by volume) or more. Moreover, in hydrogen fuel 125 containing the hydrogen as a major component, "containing hydrogen as a major component" denotes that the content ratio of hydrogen is 50 (% by volume) or more.

According to the firing method of this embodiment, since the fuel mixture 132 of the methane main fuel for mixture 131 and hydrogen fuel 125 (hydrogen fuel for mixture 128) is used as the fuel 111 containing methane to be combusted by the combusting means 102, the generation of carbon dioxide can be reduced for the content of hydrogen (hydrogen fuel 128) not to generate carbon dioxide by the combustion in the fuel mixture 132 (fuel 111). At this time, the content ratio of hydrogen contained in the fuel mixture 132 (hydrogen/fuel mixture) is preferably 5 to 95 (% by volume), and it is further preferably 25 to 75 (% by volume). In the case it is less than 5 (% by volume), the carbon dioxide reducing effect may not be sufficient. In the case it is more than 95 (% by volume), at the time of executing the methane reforming reaction, not only the combustion exhaust gas, another heat source may be needed. Moreover, carbon dioxide to be produced at the time of reacting the reforming material 123 with the methane reforming catalyst 106 is fixed by the carbon dioxide fixing device 105, thereby, the discharge of carbon dioxide produced from the reforming material 123 to the outside in a gas state can be prevented.

As shown in FIG. 3, the firing furnace 300 used for the firing method of this embodiment further comprises a fuel cell 107 so that a part of hydrogen fuel 125 can be used as hydrogen for the fuel cell 127 for the power generation. The fuel cell 107 is for the power generation by reacting hydrogen (hydrogen for the fuel cell) and oxygen or air. According to the firing method of this embodiment (third invention), a part of hydrogen fuel 125 obtained by the separation by the hydrogen separating device 104 can be separated as hydrogen for the fuel cell 127 so as to be used in the fuel cell 107 for the power generation. Since hydrogen fuel 125 is high in the hydrogen purity, the power generation can be done efficiently by the fuel cell 107 by using a part thereof as hydrogen for the fuel cell 127. For example, in the case of the power generation by the fuel cell using an ordinary hydrogen, the electric power efficiency is about 40%, however, according to the power generation by the fuel cell 107 in this embodiment, the electric power efficiency can be dramatically improved to 60 to 70%. Moreover, by combusting a part of hydrogen fuel 125 separated and obtained by the hydrogen separating device 104 finally by the combusting means 102 as hydrogen fuel for mixture 128 and utilizing the remainder thereof as hydrogen for the fuel cell 127 for the power generation by the fuel cell 107, the carbon dioxide amount contained in the combustion exhaust gas 112 can be reduced, and at the same time, the heat of the combustion gas can be collected effectively so as to be utilized for the power generation, and thus the electric energy of a high utilization value can be obtained.

As to the carbon gas exhausting amount, the fuel cell has the efficiency for converting the thermal energy to the electric energy about 2 times as high as that of the thermal power generation, or the like. Therefore, by using the electric power derived from the fuel cell instead of the electric power derived from the thermal power generation, or the like for the reduction of the carbon dioxide exhaust amount, the carbon gas cutback amount can be reduced to the half with respect to the same electric power amount. Therefore, the generated carbon dioxide can be cut back without particularly fixing carbon dioxide. By fixing carbon dioxide, a higher carbon dioxide cutback effect can be generated.

The hydrogen fuel 125 may be used as hydrogen fuel for mixture 128 for the entirety, or it may be used as hydrogen fuel for mixture 128 and hydrogen for the fuel cell 127 separately. The ratio of separating the same into hydrogen fuel for mixture 128 and hydrogen for the fuel cell 127 is not particularly limited, and it may be separated so as to balance the carbon dioxide exhaust amount and the power generation amount optionally to the optimum values.

According to the firing furnace 300 used for the firing method of this embodiment shown in FIG. 3, it is preferable that the firing furnace main body 101 has the same configuration as in the case of the firing furnace main body 1 in the firing furnace 100 of the above-mentioned embodiment of the present invention, which has been explained with reference to FIG. 1. As to the structure of providing the methane reforming device 103 in the firing furnace main body 101, the same configuration as the firing furnace main body 101 shown in FIG. 5 or 6 is preferable. Thereby, the same effect can be obtained. Moreover, the firing furnace main body 101 may be of the batch system of firing intermittently a predetermined amount of members to be fired each time, however, it is preferably a firing furnace main body 101 of continuous type for continuously conveying into its inside a member to be fired such as a ceramic honeycomb structure, and conveying the same continuously to the outside thereof after heating and firing the member to be fired in the inside. Since the temperature of the combustion gas can be stabilized constantly by firing continuously, the methane reforming reaction can be carried out stably by the heat of the combustion gas in the methane reforming device 103 in the firing furnace main body 101, and thereby hydrogen fuel 125 can be supplied stably, and thus the fuel mixture 132 obtained by mixing hydrogen fuel 125 and the methane main fuel for mixture 131 can be supplied stably to the combusting means 102.

Moreover, as the member to be fired by the firing method of this embodiment, a ceramic such as a table ware, a tile, a hygiene earthen ware and an insulator, and furthermore, a ceramic honeycomb structure can be fired preferably. Here, the ceramic honeycomb structure refers to a ceramic structure of a honeycomb structure having a plurality of cells to be the channel for a fluid, partitioned by a partition wall.

It is preferable that the combusting means 102, the methane reforming device 103, the hydrogen separating device 104, the carbon dioxide fixing device 105 and the fuel cell 107 in the firing furnace 300 used for the firing method of this embodiment shown in FIG. 3 have the same configuration as the combusting means 2, the methane reforming device 3, the hydrogen separating device 4, the carbon dioxide fixing device 5 and the fuel cell 7 in the above-mentioned firing furnace 100 of the present invention (first invention) shown in FIG. 1. Thereby, the same effect can be obtained.

According to the firing method of this embodiment, as in the case of the above-mentioned embodiment of the firing method of the present invention, as the fuel to be combusted in the combusting means 102, the fuel mixture 132 of the methane main fuel for mixture 131 containing methane as a major component and hydrogen fuel 125 (hydrogen fuel for mixture 128) separated by the hydrogen separating device 104 is used. Since the temperature of the combustion gas is not stabilized (the state with the combustion gas not yet generated or the state of gradual increment of the gas) at the time of starting the operation of the firing furnace 300 and thus it is difficult to execute the reaction by the methane reforming device 103 while using the combustion gas, the fuel mixture 132 may be used after constantly discharging the combustion gas. In this case, at the time of starting the operation of the firing furnace 300, the firing operation is executed only with the methane main fuel for mixture 131 containing methane as a major component. Moreover, in the case the combustion gas is not constantly discharged and the temperature is not stabilized at the time of starting the operation of the firing furnace 300, another heating device by steam, the electricity, or the like (not shown) may be provided in the methane reforming device 103 for operating the methane reforming device 103 while using the heating device.

The firing method according to this embodiment can be used at the time of firing a ceramic by the quantity of heat of 1,000,000 to 100,000,000 (kJ/Hr). In the case of equipment of lower than 1,000,000 (kJ/Hr), one may use an apparatus obtained by combining several sets of the small size equipment for the present invention. Although the present invention can be applied to the equipment of 1,000,000 (kJ/Hr) or less, it is not economical in the present situation wherein the methane steam reforming equipment is expensive.

According to the firing method of this embodiment, as in the case of the above-mentioned embodiment of the firing method of the present invention, the volume ratio of the methane sub fuel for reformation 121 and the methane main fuel for mixture 131 (the methane sub fuel for reformation 121: the methane main fuel for mixture 131) is preferably 5:95 to 100:0 (volume ratio). In the case the ratio of the methane sub fuel for reformation 121 is less than 5 (volume ratio), carbon dioxide may not be cut back sufficiently. Moreover, at least one of the methane main fuel for mixture 131 and the methane sub fuel for reformation 121 can be a liquefied natural gas (LNG). By having the same as the LNG, the combusting operation can be executed efficiently owing to the good combustion property of the LNG. Moreover, since the LNG is a clean and inexpensive fuel, the hazardous substances such as the sulfur oxide and the dusts are not generated by the combustion, and thus it is preferable.

Next, according to the fuel use amounts and the difference of the generated quantity of heat, and the difference of the generated carbon dioxide at the time of using the fuel mixture 132 of the methane main fuel for mixture 131 and hydrogen fuel 125 (hydrogen fuel for mixture 128) and combusting the same in the combusting means 102 (this embodiment) as the firing method of this embodiment and at the time of using only methane gas (a gas having the 100 (%) methane content ratio) as the fuel 111 and combusting the same in the combusting means 102 (comparative example), the same results as in the case of same comparison for the above-mentioned firing furnace 100 of the present invention shown in FIG. 1 can be obtained. That is, in the case the only methane gas is combusted as the fuel 111, the quantity of heat of 39,800 (kJ/Hr) can be obtained for the use of 1 ($Nm^3$/Hr) methane gas. On the other hand, in the case of this embodiment, the quantity of heat to be obtained can be 40,380 (kJ/Hr) for the 0.9 ($Nm^3$/Hr) total amount of methane gas used (the total of the methane main fuel for mixture 131 and the methane sub fuel for reformation 121). Moreover, since the carbon dioxide amount to be generated at the time of combusting 1 mole of methane gas is 1 mole (theoretical amount), in the case of the above-mentioned comparative example, 1 ($Nm^3$/Hr) of carbon dioxide is generated. On the other hand, in the case of this embodiment, 0.5 ($Nm^3$/Hr) of carbon dioxide is generated. Therefore, in the comparison of this embodiment and the case of the comparative example, the amount of methane gas used for having the quantity of heat to be generated by the combustion by the combusting means 102 substantially equally (that of this embodiment is slightly larger) can be cut back by 10% in the case of this embodiment with respect to the case of the comparative example. Furthermore, carbon dioxide amount to be generated can be cut back by 50% in the case of this embodiment with respect to the case of the comparative example.

Moreover, although the methane reforming device is provided in the firing furnace main body in the firing method of this embodiment, a methane reforming device used in the above-mentioned embodiment of the firing method of the present invention, which has been explained with reference to FIG. 1 may be further provided outside the firing furnace main body. That is, the methane reforming devices are provided inside and outside the firing furnace main body so that the methane reformation is carried out utilizing the heat of the combustion gas in the inside and the methane reformation is carried out utilizing the heat of the combustion exhaust gas at the outside.

Next, still another embodiment of the firing method of the present invention will be explained with reference to FIG. 4 showing the above-mentioned still another embodiment of the firing furnace of the present invention.

As the firing furnace 400 to be used for the firing method of this embodiment, the above-mentioned still another embodiment of the firing furnace of the present invention, which has been explained with reference to FIG. 4 can be used preferably. The firing method of this embodiment is a firing method comprising the steps of generating a combustion gas by flowing a fuel containing methane 161 into a combusting means 152 and combusting, introducing the combustion gas generated in the combusting means 152 into the inside of a firing furnace main body 151, and heating and firing a member to be fired conveyed into its inside by the combustion gas. Furthermore, a reforming material 173 composed of a methane sub fuel for reformation 171 having methane flown therein as a major component and steam 172 is flown into a methane reforming device 153 provided in the firing furnace main body 151 and filled with a methane reforming catalyst 156 in the inside, and contacting the reforming material 173 with the methane reforming catalyst 156 while heating by the combustion gas so as to react methane in the reforming material 173 with steam 172 for producing a reformed gas 174 containing hydrogen and carbon dioxide.

According to the firing method of this embodiment, since the quantity of heat of the combustion gas is used in the firing furnace main body 151 as the quantity of heat necessary for the endothermic reaction at the time of reacting the above-mentioned reforming material 173 with the methane reforming catalyst 156, a part of the heat of the combustion gas can be collected and used again as the combustion heat of the fuel so that the total use amount of the fuel can be cut back.

Then, according to the firing method of this embodiment, by further separating the reformed gas 174 produced by the methane reforming device 153 into hydrogen fuel 175 containing hydrogen as a major component and the residual gas.176 containing carbon dioxide by selectively separating hydrogen in the reformed gas 174 by flowing the same into the inside of the hydrogen separating device 155, flowing the residual gas 176 separated by the hydrogen separating device 154 into the carbon dioxide fixing device 155, fixing carbon dioxide in the residual gas 176 by the fixing agent 191 not so as to discharge it to the outside in a gas state, and flowing hydrogen fuel 175 separated by the hydrogen separating device 154 into the fuel cell 157 as hydrogen for the fuel cell 177 for the power generation by the reaction of hydrogen for the fuel cell 177 and oxygen or air, the heat of the combustion gas can be used for generating the reformed gas 174 containing hydrogen gas by the methane reforming device 153, separating hydrogen fuel 175 from the reformed gas 174 by the hydrogen separating device 154, using hydrogen fuel 175 for the power generation by the fuel cell 157 as hydrogen for the fuel cell 177, and converting a part of the heat energy of the combustion gas to the electric energy. The combustion exhaust gas 162 is discharged to the outside. Moreover, after fixing carbon dioxide by the fixing agent 191, it is discharged to the outside as the waste liquid 192.

According to the firing method of this embodiment, since the total amount of hydrogen fuel 175 is used as hydrogen for the fuel cell 177 for the power generation by the fuel cell 157, the heat of the combustion gas can be collected effectively so as to be utilized for the power generation, and thus the electric energy of a higher utilization value can be obtained. Since hydrogen fuel 175 contains hydrogen of a high purity, by the use as hydrogen for the fuel cell 177, the power generation can be done efficiently in the fuel cell 157. For example, in the case of the power generation by an ordinary fuel cell using hydrogen, the electric power efficiency is about 40%, however, according to the power generation by the fuel cell 157 in this embodiment, the electric power efficiency can be improved dramatically to 60 to 70%.

Moreover, according to the firing method of this embodiment, since carbon dioxide to be produced at the time of reacting the above-mentioned reforming material 173 with the methane reforming catalyst 156 is fixed by the carbon dioxide fixing device 155, the discharge of carbon dioxide produced from the reforming material 173 to the outside in a gas state can be prevented.

According to the firing furnace 400 used for the firing method of this embodiment shown in FIG. 4, it is preferable that the firing furnace main body 151 has the same configuration as in the case of the firing furnace main body 1 in the above-mentioned embodiment of the firing furnace of the present invention shown in FIG. 1. As the structure for providing the methane reforming device 153 in the inside of the firing furnace main body 151, the same configuration of the firing furnace main body 101 shown in FIG. 5 or 6 is preferable. Thereby, the same effect can be obtained. Moreover, the firing furnace main body 151 may be of the batch system of firing intermittently a predetermined amount of members to be fired each time, however, it is preferably a firing furnace main body 151 of continuous type for continuously conveying into its inside a member to be fired such as a ceramic honeycomb structure, and conveying the same continuously to the outside thereof after heating and firing the member to be fired in the inside. Since the temperature of the combustion gas can be stabilized constantly in the firing furnace main body 151 by firing continuously, the methane reforming reaction can be carried out stably by the heat of the combustion gas in the methane reforming device 153, and thereby hydrogen fuel 175 can be supplied stably, and thus the power generation can be carried out stably by the fuel cell 157.

Moreover, as the member to be fired by the firing method of this embodiment, a ceramic such as a table ware, a tile, a hygiene earthen ware and an insulator, and furthermore, a ceramic honeycomb structure can be fired preferably. Here, the ceramic honeycomb structure refers to a ceramic structure of a honeycomb structure having a plurality of cells to be the channel for a fluid, partitioned by a partition wall.

It is preferable that the combusting means 152, the methane reforming device 153, the hydrogen separating device 154, the carbon dioxide fixing device 155 and the fuel cell 157 in the firing furnace 400 used for the firing method of this embodiment shown in FIG. 4 have the same configuration as in the case of the combusting means 2, the methane reforming device 3, the hydrogen separating device 4, the carbon dioxide fixing device 5 and the fuel cell 7 in the firing furnace 100 as the above-mentioned embodiment of the firing furnace of the present invention shown in FIG. 1. Thereby, the same effect can be obtained. However, it is preferable that the fuel containing methane 161 contains methane as a major component, and the combusting means 152 is one capable of efficiently combusting the fuel containing methane as a major component 161. Here, "containing methane as a major component" denotes that the content ratio of methane is 80 (% by volume) or more.

According to the firing furnace 400 of this embodiment, since a combustible substance such as carbon monoxide, or the like may be contained in the residual gas 176, in the case such a combustible substance is contained, a part or the entirety of the residual gas 176 may be combusted by the combusting means 152. Since the fuel can be collected, it is preferable.

The firing method according to this embodiment can be used at the time of firing a ceramic by the quantity of heat of 1,000,000 to 100,000,000 (kJ/Hr). In the case of equipment of lower than 1,000,000 (kJ/Hr), one may use an apparatus obtained by combining several sets of the small equipment for the present invention. Although the present invention can be applied to the equipment of 1,000,000 (kJ/Hr) or less, it is not economical in the present situation wherein the methane steam reforming equipment is expensive.

INDUSTRIAL APPLICABILITY

The present invention can be utilized as the firing furnace for firing a ceramic, or the like in the ceramic industry, or the like. Thereby, the heat of the combustion gas generated by the firing furnace or of the combustion exhaust gas to be discharged form the firing furnace can be collected. Furthermore, carbon dioxide contained in the combustion exhaust gas can be reduced so that the carbon dioxide amount to be discharged into the atmosphere can be reduced, and furthermore, the fuel cost can be reduced. Moreover, by collecting and utilizing the heat energy of the combustion exhaust gas, the power generation can be carried out by the fuel cell.

What is claimed is:

1. A firing furnace comprising:
   a combusting means;
   a firing furnace main body for heating and firing a member; and
   a methane reforming device filled with a methane reforming catalyst,
   wherein said combusting means is for generating a combustion gas by combustion of a fuel containing methane ducted therein and after firing for exhausting the combustion gas from the furnace,
   wherein said methane reforming catalyst is for producing a reformed gas containing hydrogen and carbon dioxide by contacting the methane reforming catalyst with a reforming material comprising a methane sub fuel of methane and steam, while simultaneously heating the reforming material with the combustion gas to make methane in the reforming material react with steam.

2. The firing furnace according to claim 1, wherein the methane reforming device is located inside the firing furnace main body for causing reforming material to contact the methane reforming catalyst while combustion gas heats the reforming material to produce reformed gas.

3. The firing furnace according to claim 1, wherein the methane reforming device is located outside the firing furnace main body for causing the reforming material to contact the methane reforming catalyst so that combustion gas exhausted from the firing furnace main body heats the reforming material to produce the reformed gas.

4. The firing furnace according to claim 1, further comprising a fuel cell for generating electricity by reaction of hydrogen and oxygen or air, wherein said fuel cell is for using at least a part of hydrogen contained in the reformed gas for reaction with oxygen or air in the fuel cell.

5. The firing furnace according to claim 4, further comprising a hydrogen separating device for separating the reformed gas produced in the methane reforming device by flowing the reformed gas into the hydrogen separating device for selectively separating hydrogen in the reformed gas into a hydrogen fuel comprising hydrogen and a residual gas comprising carbon dioxide.

6. The firing furnace according to claim 4, wherein the firing furnace main body is a continuous firing furnace main body for continuously conveying a member to be fired into the furnace main body and continuously conveying such member from the furnace main body after heating such member.

7. The firing furnace according to claim 4, wherein at learnt one of methane sub fuel for reformation and methane main fuel for mixture is a liquefied natural gas.

8. The firing furnace according to claim 1, further comprising a hydrogen separating device for separating the reformed gas produced in the methane reforming device by flowing the reformed gas into the inside thereof for selectively separating hydrogen in the reformed gas into a hydrogen fuel containing hydrogen as a major component and a residual gas containing carbon dioxide.

9. The firing furnace according to claim 8, further comprising a fuel cell, said fuel cell for using at least a part of the hydrogen fuel for reaction with oxygen or air in the fuel cell.

10. The firing furnace according to claim 8, further comprising means for mixing at least a part of hydrogen fuel with a methane main fuel to form a fuel mixture comprising methane wherein said combusting means is for combusting the fuel mixture.

11. The firing furnace according to claim 10, wherein the volume ratio of the methane sub fuel for reformation and the methane main fuel for mixture (methane sub fuel for reformation: methane main fuel for mixture) is 5:95 to 100:0.

12. The firing furnace according to claim 8, further comprising a fuel cell, said fuel cell for using a part of hydrogen fuel for reaction with oxygen or air in the fuel cell and means for mixing a remainder part with a methane main fuel to form a fuel mixture comprising methane wherein said combusting means is for combusting the fuel mixture.

13. The firing furnace according to claim 12, wherein the volume ratio of the methane sub fuel for reformation and the methane main fuel for mixture (methane sub fuel for reformation: methane main fuel for mixture) is 5:95 to 100:0.

14. The firing furnace according to claim 8, further comprising a firing means, wherein the residual gas exhausted from the hydrogen separating device is combusted by said firing means.

15. The firing furnace according to claim 8, further comprising a carbon dioxide fixing device for fixing carbon dioxide in the residual gas separated by the hydrogen separating device, so that said firing furnace does not discharge carbon dioxide in a gaseous state from the furnace.

16. The firing furnace according to claim 15, wherein the carbon dioxide fixing device contains sodium hydroxide as a fixing agent for fixing carbon dioxide to produce sodium carbonate by making sodium hydroxide react with carbon dioxide.

17. The firing furnace according to claim 8, wherein the firing furnace main body is a continuous firing furnace main body for continuously conveying a member to be fired into the furnace main body and continuously conveying such member from the furnace main body after heating such member.

18. The firing furnace according to claim 8, wherein at least one of methane sub fuel for reformation and methane main fuel for mixture is a liquefied natural gas.

19. The firing furnace according to claim 1, wherein the firing furnace main body is a continuous firing furnace main body for continuously conveying a member to be fired into the furnace main body and continuously conveying such member from the furnace main body after heating such member.

20. The firing furnace according to claim 1, wherein at least one of methane sub fuel for reformation and methane main fuel for mixture is a liquefied natural gas (LNG).

21. A firing method comprising:
   generating a combustion gas by flowing a fuel containing methane into a combusting means and combusting such fuel, said generating comprising:
   contacting the methane reforming catalyst with a reforming material comprising a methane sub fuel of methane and steam to produce a reformed gas containing hydrogen and carbon dioxide, while simultaneously heating the reforming material with the combustion gas to make methane in the reforming material react with steam;
   introducing the combustion gas generated in the combusting means into a firing furnace main body,
   heating and firing a member with the combustion gas, the member having been conveyed into the furnace main body, and
   exhausting the combustion gas out of the firing furnace main body after firing.

22. The firing method according to claim 21, wherein the methane reforming device is located inside the firing furnace main body for causing the reforming material to contact the methane reforming catalyst while combustion gas heats the reforming material to produce a reformed gas.

23. The firing method according to claim 21, wherein the methane reforming device is located outside the firing furnace main body for causing the reforming material to contact the methane reforming catalyst while combustion gas exhausted out of the firing furnace main body heats the reforming material to produce a reformed gas.

24. The firing method according to claim 21, wherein at least a part of hydrogen contained in the reformed gas reacts with oxygen or air in a fuel cell for the power generation.

25. The firing method according to claim 24, wherein the reformed gain produced in the methane reforming device is conveyed into the hydrogen separating device for selectively separating hydrogen in the reformed gas into hydrogen fuel containing hydrogen as a major component and a residual gas containing carbon dioxide.

26. The firing method according to claim 24, wherein the firing furnace main body is a continuous firing furnace main body for continuously conveying a member to be fired into the furnace main body and continuously conveying such member out of the furnace main body after heating such member.

27. The firing method according to claim 24, wherein at least one of the methane sub fuel for reformation and the methane main fuel forming a mixture is a liquefied natural gas.

28. The firing method according to claim 21, wherein the reformed gas produced in the methane reforming device is conveyed into a hydrogen separating device for selectively separating hydrogen in the reformed gas into hydrogen fuel containing hydrogen as a major component and a residual gas containing carbon dioxide.

29. The firing method according to claim 28, wherein at least a part of hydrogen fuel is used for reaction with oxygen or air in the fuel cell as hydrogen for a fuel cell.

30. The firing method according to claim 28, wherein at least a of hydrogen fuel is mixed with a methane main fuel to form a fuel mixture comprising methane, wherein said combusting means is for combusting fuel mixture.

31. The firing method according to claim 30, wherein the mixture of methane sub fuel for reformation and the methane main fuel have a volume ratio (methane sub fuel for reformation: methane main fuel for mixture) of 5:95 to 100:0.

32. The firing method according to claim 28, wherein a part of hydrogen fuel is used for reaction with oxygen or air in a fuel cell, and a remainder part is mixed with a methane main fuel to form a fuel mixture containing methane as a major component, wherein said combusting means is for combusting the fuel mixture.

33. The firing method according to claim 32, wherein the mixture of methane sub fuel for reformation and the methane main fuel have a volume ratio (methane sub fuel for reformation: methane main fuel for mixture) of 5:95 to 100:0.

34. The firing method according to claim 28, wherein residual gas exhausted from the hydrogen separating device is combusted in the firing means.

35. The firing method according to claim 28, wherein the firing furnace main body is a continuous firing furnace main body for continuously conveying a member to be fired into the furnace main body and continuously conveying such member out of the furnace main body after heating such member.

36. The firing method according to claim 28, wherein at least one of the methane sub fuel for reformation and the methane main fuel forming a mixture is a liquefied natural gas.

37. The firing method according to claim 28, wherein residual gas separated in the hydrogen separating device is conveyed to a carbon dioxide fixing device for fixing carbon dioxide in the residual gas so that said firing furnace main body does not discharge gaseous carbon dioxide out of the furnace main body.

38. The firing method according to claim 37, wherein the carbon dioxide fixing device contains sodium hydroxide as a fixing agent for fixing carbon dioxide to produce sodium carbonate by making sodium hydroxide react with carbon dioxide.

39. The firing method according to claim 21, wherein the firing furnace main body is a continuos firing furnace main body for continuosly conveying a member to be fired into the furnace main body and continuously conveying such member out of the furnace main body after heating such member.

40. The firing method according to claim 21, wherein at least one of the methane sub fuel for reformation and the methane main fuel a mixture is a liquified natural gas.

41. The firing method according to claim 21, wherein a member to be fired comprises a ceramic material.

42. The firing method according to claim 21, wherein a member to be fired comprises a honeycomb structure.

* * * * *